United States Patent
Kawanishi

(10) Patent No.: US 10,671,332 B2
(45) Date of Patent: Jun. 2, 2020

(54) IMAGE FORMING APPARATUS, CONTROL METHOD OF IMAGE FORMING APPARATUS HAVING PRINT PAGE SETTING, AND STORAGE MEDIUM

(71) Applicant: CANON KABUSHIKI KAISHA, Tokyo (JP)

(72) Inventor: Masaki Kawanishi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/123,090

(22) Filed: Sep. 6, 2018

(65) Prior Publication Data

US 2019/0079714 A1    Mar. 14, 2019

(30) Foreign Application Priority Data

Sep. 13, 2017 (JP) .................. 2017-175991

(51) Int. Cl.
  *G06F 3/12*   (2006.01)
  *G03G 15/00*  (2006.01)
  *H04N 1/00*   (2006.01)

(52) U.S. Cl.
  CPC ....... *G06F 3/1237* (2013.01); *G03G 15/5012* (2013.01); *G03G 15/5083* (2013.01); *G03G 15/553* (2013.01); *G06F 3/1219* (2013.01); *H04N 1/0001* (2013.01)

(58) Field of Classification Search
  CPC .................................................... G06F 3/1237
  USPC ....................................................... 358/1.15
  See application file for complete search history.

(56) References Cited

U.S. PATENT DOCUMENTS

| | | | |
|---|---|---|---|
| 9,147,135 B2 | 9/2015 | Kawanishi | |
| 2005/0275867 A1* | 12/2005 | Higashiura | G06K 15/00 358/1.14 |
| 2008/0075478 A1* | 3/2008 | Kohara | G03G 15/553 399/16 |
| 2011/0286033 A1* | 11/2011 | Konita | G06F 3/1207 358/1.15 |
| 2012/0105895 A1* | 5/2012 | Ikemoto | G06F 3/1219 358/1.14 |

FOREIGN PATENT DOCUMENTS

JP    2005-349702 A    12/2005

\* cited by examiner

*Primary Examiner* — Jacky X Zheng
(74) *Attorney, Agent, or Firm* — Venable LLP

(57) ABSTRACT

An image forming apparatus includes at least one memory that stores instructions, and at least one processor to execute the instructions to set a limit of a number of print pages, and receive a print job from an external apparatus. In a case where the received print job is a reserved print job for which a print setting has been made to wait for printing until a print start time specified by a user, a first counter indicating a reserved number of print pages based on the received reserved print job before starting execution of the received reserved print job is updated, and a second counter relating to an upper limit of a number of print pages in accordance with execution of printing based on the received print job is updated. In a case where a new print job is received in a state where a sum of the first counter and the second counter has reached the set limit of the number of print pages, a user is notified of a predetermined error.

12 Claims, 24 Drawing Sheets

|  | USER NAME | EMAIL ADDRESS | DEPARTMENT ID | ROLE NAME |
|---|---|---|---|---|
| 905 | Administrator | Admin@example.com |  | Administrator |
| 906 | User1 | User1@example.com | 0000001 | GeneralUser |
| 907 | User2 | User2@example.com | 0000001 | GeneralUser |
| 908 | User3 | User3@example.com | 0000002 | GeneralUser |
| 909 | User4 | User4@example.com | 0000003 | GeneralUser |

| DEPARTMENT ID | LIMITED NUMBER OF PAGES | NUMBER OF OUTPUT PAGES | NUMBER OF RESERVED PAGES |
|---|---|---|---|
| | TOTAL PRINT | TOTAL PRINT | TOTAL PRINT |
| 0000001 | 2000 | 1800 | 0 |
| 0000002 | 3000 | 1000 | 0 |
| 0000003 | --------- | 0 | 0 |

FIG.13B

| DEPARTMENT ID | LIMITED NUMBER OF PAGES | NUMBER OF OUTPUT PAGES | NUMBER OF RESERVED PAGES |
|---|---|---|---|
| | TOTAL PRINT | TOTAL PRINT | TOTAL PRINT |
| 0000001 | 2000 | 1800 | 180 |
| 0000002 | 3000 | 1000 | 0 |
| 0000003 | --------- | 0 | 0 |

FIG.13C

| DEPARTMENT ID | LIMITED NUMBER OF PAGES | NUMBER OF OUTPUT PAGES | NUMBER OF RESERVED PAGES |
|---|---|---|---|
| | TOTAL PRINT | TOTAL PRINT | TOTAL PRINT |
| 0000001 | 2000 | 1800 | 0 |
| 0000002 | 3000 | 1000 | 0 |
| 0000003 | --------- | 0 | 0 |

FIG.13D

| DEPARTMENT ID (1301) | LIMITED NUMBER OF PAGES (1302) TOTAL PRINT | NUMBER OF OUTPUT PAGES (1303) TOTAL PRINT | NUMBER OF RESERVED PAGES (1304) TOTAL PRINT |
|---|---|---|---|
| 0000001 (1305) | 2000 | 1980 | 0 |
| 0000002 (1306) | 3000 | 1000 | 0 |
| 0000003 (1307) | --------- | 0 | 0 |

FIG.13E

| DEPARTMENT ID (1301) | LIMITED NUMBER OF PAGES (1302) TOTAL PRINT | NUMBER OF OUTPUT PAGES (1303) TOTAL PRINT | NUMBER OF RESERVED PAGES (1304) TOTAL PRINT |
|---|---|---|---|
| 0000001 (1305) | 2000 | 1820 | 180 |
| 0000002 (1306) | 3000 | 1000 | 0 |
| 0000003 (1307) | --------- | 0 | 0 |

FIG.13F

| DEPARTMENT ID (1301) | LIMITED NUMBER OF PAGES (1302) TOTAL PRINT | NUMBER OF OUTPUT PAGES (1303) TOTAL PRINT | NUMBER OF RESERVED PAGES (1304) TOTAL PRINT |
|---|---|---|---|
| 0000001 (1305) | 2000 | 2000 | 0 |
| 0000002 (1306) | 3000 | 1000 | 0 |
| 0000003 (1307) | --------- | 0 | 0 |

| DATE AND TIME OF RECEPTION 1701 | USER ID 1702 | PRINT JOB DATA NAME 1703 | OUTPUT METHOD 1704 | RESERVED TIME 1705 | STORAGE LOCATION 1706 |
|---|---|---|---|---|---|
| 2017/06/03 9:00 | User1 | DDD.txt | HOLD | NULL | /data/User1/doc1 |
| 2017/06/03 9:05 | User1 | BBB.docx | RESERVED PRINTING | 2017/06/04/03:00 | /data/User1/doc1 |
| 2017/06/03 10:00 | User2 | EEE.docx | HOLD | NULL | /data/User2/doc2 |
| 2017/06/03 10:00 | User3 | FFF.docx | HOLD | NULL | /data/User3/doc3 |
| 2017/06/03 11:00 | User3 | AAA.pdf | RESERVED PRINTING | 2017/06/04/04:00 | /data/User3/doc1 |
| 2017/06/03 12:00 | User3 | CCC.pptx | RESERVED PRINTING | 2017/06/04/04:30 | /data/User3/doc2 |

IMAGE FORMING APPARATUS, CONTROL METHOD OF IMAGE FORMING APPARATUS HAVING PRINT PAGE SETTING, AND STORAGE MEDIUM

BACKGROUND OF THE INVENTION

Field of the Invention

The present invention relates to a technique to control execution of a print job.

Description of the Related Art

Conventionally, there exists an image forming apparatus including a reserved print function to perform a reserved print job for which the start time of printing is specified at the specified start time. The image forming apparatus having received a reserved print job holds the reserved print job until the specified start time is reached and performs the reserved print job at the specified start time. Reserved printing aims at performing printing without impeding printing performed by another user by specifying the middle of the night or the lunch hour as the start time of printing in the case where a user performs printing of a large number of sheets.

Further, within a company, there exists an image forming apparatus including a departmental ID management and number of output pages limiting function to limit the number of output pages of printing for each department to which a user belongs. The purpose of the departmental ID management and number of output pages limiting function is to manage the printing cost by providing a limit to the number of output pages (that is, limit to the number of print pages) of printing for each department to which a user belongs. Further, Japanese Patent Laid-Open No. 2005-349702 has disclosed an image forming apparatus that performs printing processing by changing a limit to printing in the case where an inquiry is made to an administrator about the limit to printing, such as whether or not utilization is available and the number of print sheets, for each user in response to a change request from a user and permission is obtained. By doing so, this image forming apparatus enables printing processing in accordance with necessity of printing.

However, in the above-described technique, a count relating to the limit to the number of print pages, which takes a reserved print job into consideration, is not performed. In reserved printing, there is a time difference between the time of reception of a reserved print job and the start time. Because of this, there is a case where the image forming apparatus receives another print job (for example, a normal print job that is performed sequentially without being held after the image forming apparatus receives) and performs the print job during the period of time from reception of a reserved print job until execution thereof. In such a situation, even though the image forming apparatus is in the state of capable of normally performing a reserved print job within the limit to the number of print pages at the time of reception of the reserved print job, there is a case where it is no longer possible to normally complete the reserved print job within the limit to the number of print pages as a result of performing another print job.

The present invention has been made in view of such a problem and an object thereof is to complete a reserved print job normally by performing a count relating to the limit to the number of print pages, which takes into consideration the reserved print job.

SUMMARY OF THE INVENTION

The image forming apparatus according to one embodiment of the present invention has a set unit configured to set a limit to a number of print pages and a count unit configured to perform a count relating to the limit to the number of print pages in accordance with execution of a print job. The count unit performs the count relating to the limit to the number of print pages before execution of a reserved print job for which a start time of printing is specified.

Further features of the present invention will become apparent from the following description of exemplary embodiments with reference to the attached drawings.

BRIEF DESCRIPTION OF THE DRAWINGS

FIG. 9 is a diagram showing an example of a user information management table;

FIG. 13A to FIG. 13F are diagrams each showing an example of a number pages management table;

FIG. 17 is a diagram showing an example of a held print job list;

DESCRIPTION OF THE EMBODIMENTS

In the following, embodiments for embodying the present invention are explained in detail by using the drawings.

Figure 1:
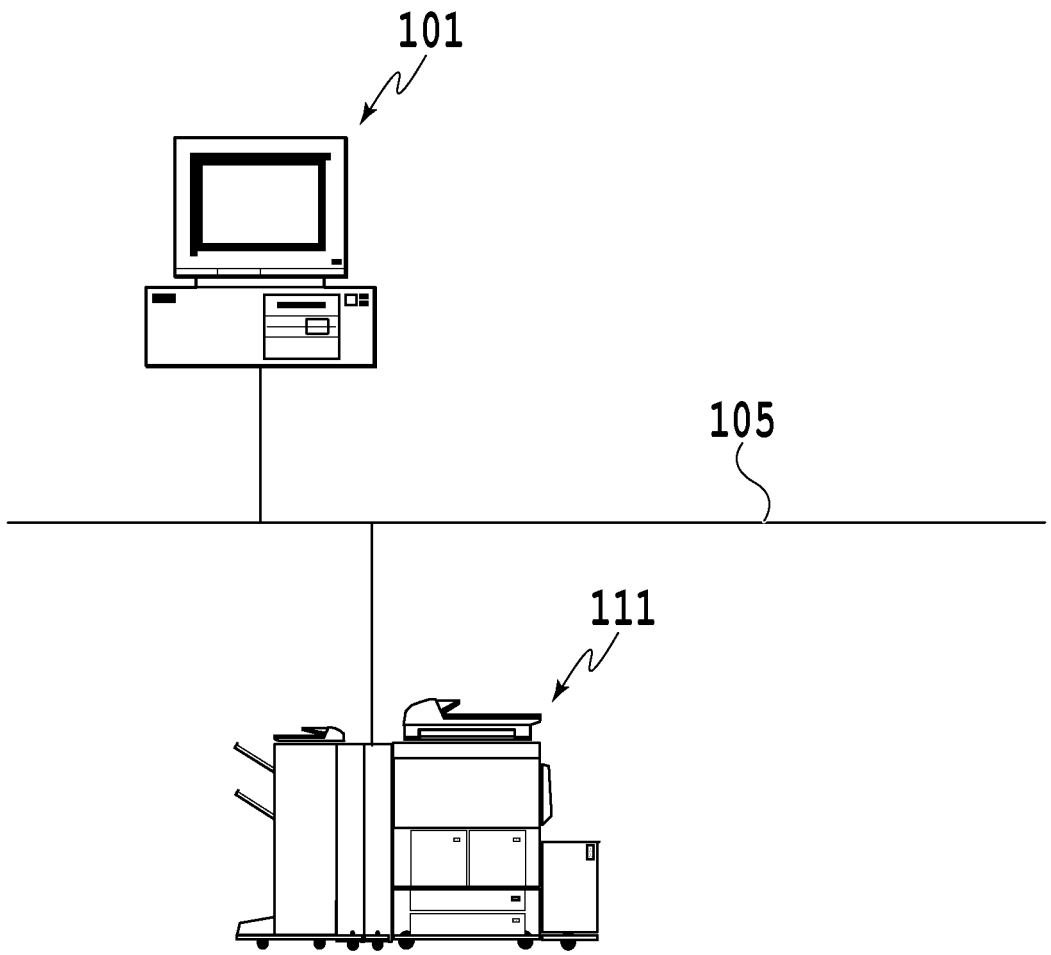
FIG. 1 is a diagram schematically showing a configuration of a network including an image forming apparatus.

FIG. 1 is a diagram schematically showing a configuration of a network including an image forming apparatus 111 according to one embodiment of the present invention. An information processing terminal 101 is connected to a network 105 and transmits a print job specified by a user to the image forming apparatus 111 via the network 105. The image forming apparatus 111 performs the print job received from the information processing terminal 101 and prints print data included in the print job. The network 105 is, for example, a LAN (Local Area Network) configured by using the standard, such as Ethernet (registered trademark).

Figure 2:
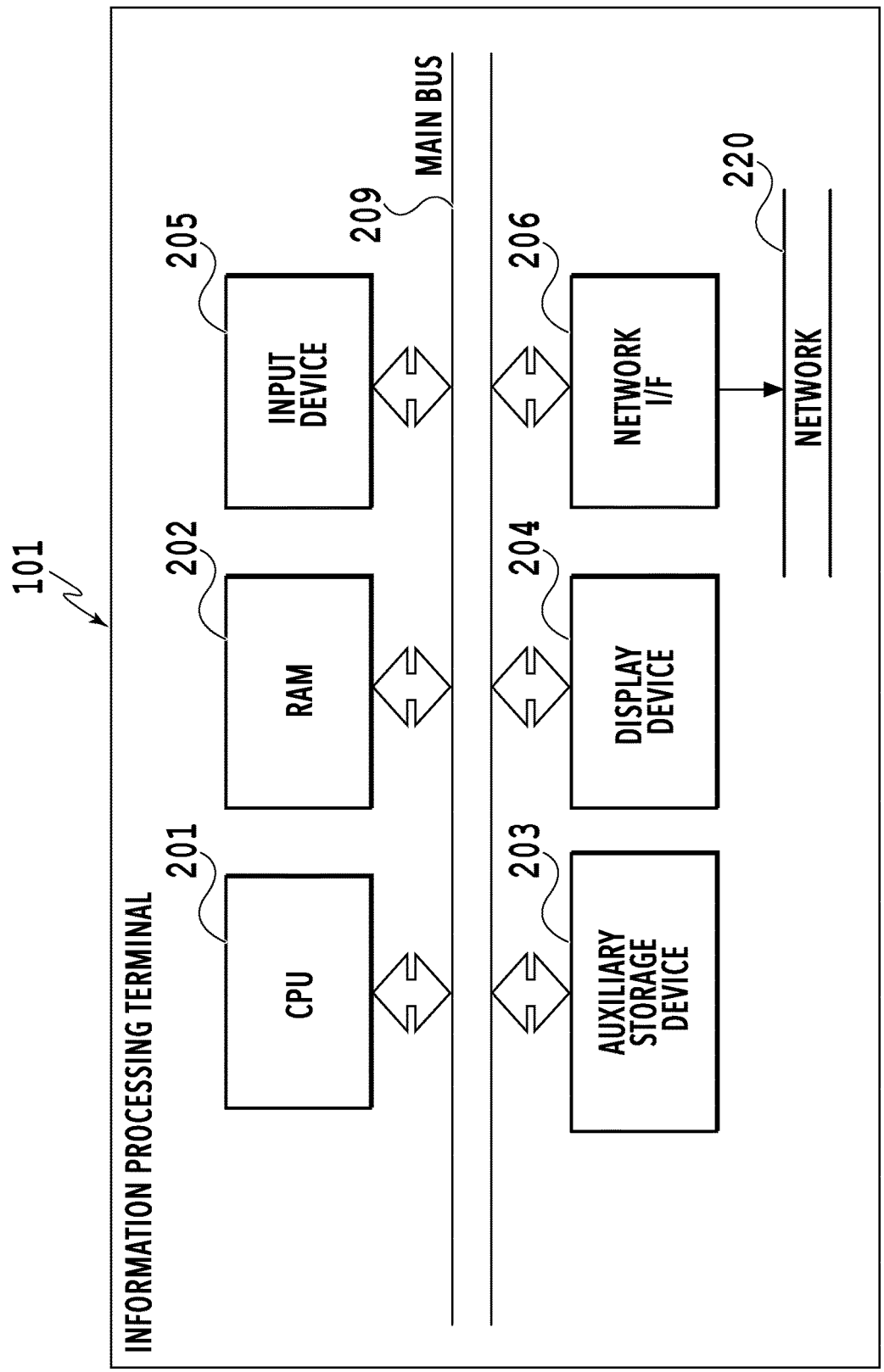
FIG. 2 is a diagram showing an internal configuration of an information processing terminal.

FIG. 2 is a diagram showing an example of an internal configuration of the above-described information processing terminal 101. A CPU 201 controls each component of the information processing terminal 101 by executing control programs, to be described later. A RAM 202 is a memory that provides a work area of the CPU 201. An auxiliary storage device 203 is a storage device that stores control programs and is, for example, a hard disk, a floppy disk (registered trademark), a CD-ROM, and so on. A display device 204 is a device that displays a message and the like for a user and specifically, a CRT display, a liquid crystal display, and so on. An input device 205 is a device for a user to input a command and the like and is, specifically, a mouse, a keyboard, and so on. A network interface (I/F) 206 is a device for the information processing terminal 101 to perform transmission and reception of data with another network device via a network 220. The network I/F 206 is, for example, a network interface card (NIC). A main bus 209 connects each of the above-described components so as to be capable of communication with one another.

Figure 3:
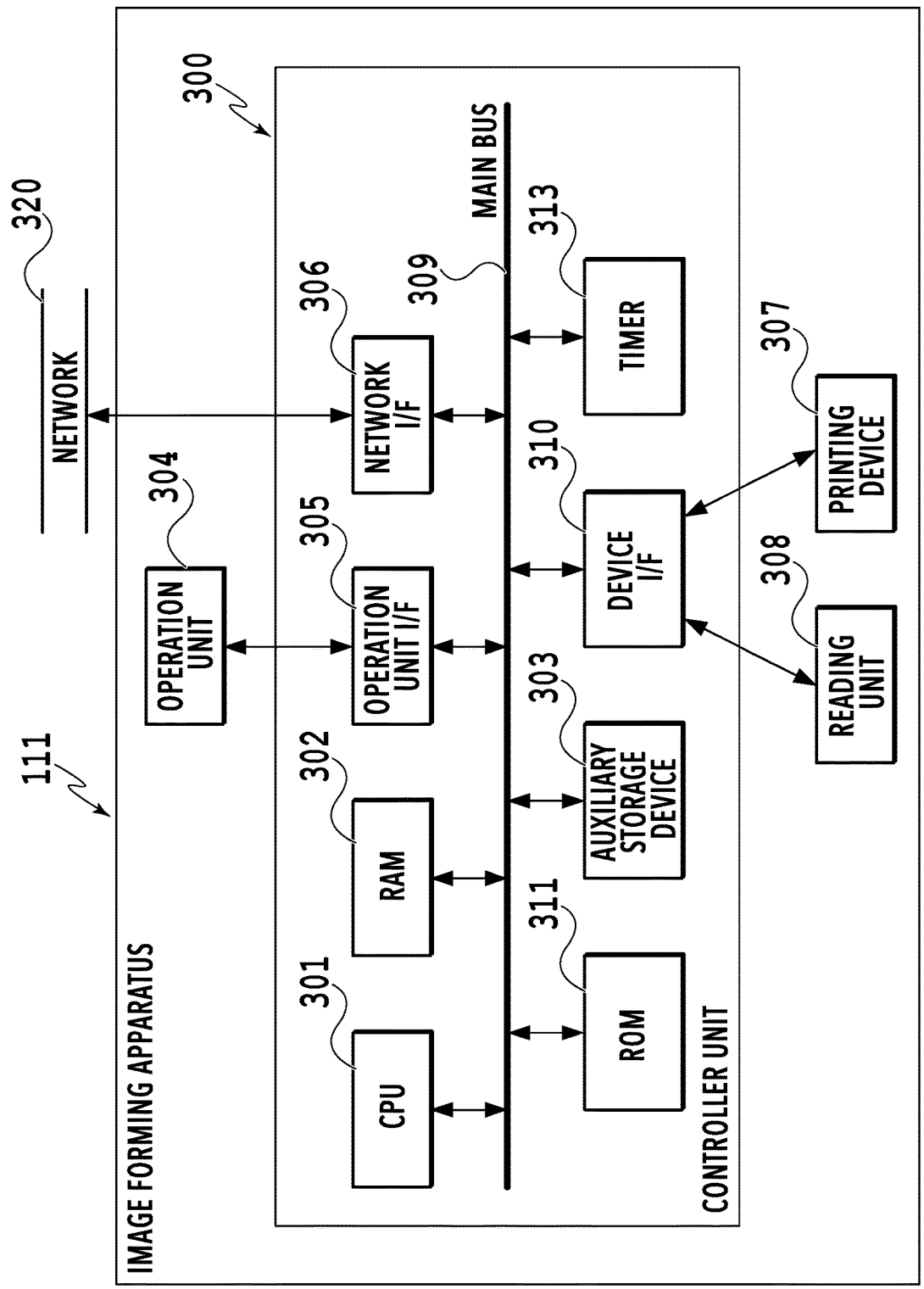
FIG. 3 is a diagram showing an internal configuration of the image forming apparatus.

FIG. 3 is a diagram showing an example of an internal configuration of the above-described image forming apparatus 111. The image forming apparatus 111 has an operation unit 304, a printing device 307, a reading unit 308, and a controller unit 300 configured to control these units. In the controller unit 300, a CPU 301 controls each component by executing control programs, to be described later. A RAM 302 temporarily stores programs, such as an OS (Operation System), system software, and application software, loaded for the CPU 301 to execute and various kinds of data. That is, the RAM 302 is a memory for providing a work area to the CPU 301 and temporarily storing data. A ROM 311 is a memory for storing an activation program and the like of the image forming apparatus 111. Further, the ROM 311 may store data necessary for image forming processing, such as system programs, application programs, and fonts. An auxiliary storage device 303 is a storage device that stores programs, such as an OS, system software, and application software, and various kinds of data, and is, for example, a hard disk, a CD-ROM, and so on. There is a case where the auxiliary storage device 303 is used in place of the RAM 302. A timer 313 manages time and is used by the CPU 301 to determine the time in the case of performing a reserved print job at a specified start time, and the like. A main bus 309 connects each component of the controller unit 300 so as to be capable of communication with one another. An operation unit I/F 305 notifies the operation unit 304 including a display unit of the state of the image forming apparatus 111, an error message, and so on. Further, the operation unit I/F 305 notifies the CPU 301 of information input by a user on the operation unit 304. The display unit of the operation unit 304 may be a touch panel enabling an input by a user. A network I/F 306 is a device for performing transmission and reception of data in the bidirectional direction with another network device via a network 320, such as a LAN. The network I/F 306 is, for example, a network interface card. A device I/F 310 connects the reading unit 308 and the printing device 307, which are image input and output devices, with the controller unit 300 and inputs and outputs image data. The reading unit 308 is, for example, a scanner. The image data that is input from the reading unit 308 via the device I/F 310 is stored in the RAM 302 and the auxiliary storage device 303. For the stored image data, image processing or the like is performed in accordance with application programs arranged in the RAM 302 as needed. Further, the image data is output to the printing device 307 via the device I/F 310. The image forming apparatus 111 may have a configuration in which the reading unit 308 is not mounted, as in the case with an SFP (Single Function Peripheral). That is, it is possible for the image forming apparatus 111 to input and output image data to and from another external device connected to the network 320 via the network I/F 306.

The configuration of the image forming apparatus 111 is not limited to the configuration shown in FIG. 3. For example, in the case where the image forming apparatus 111 has a fax function, the controller unit 300 includes an I/F for a modem device, not shown schematically, and it is possible to perform fax transmission by connecting to the public line by the modem device. Further, it may also be possible for the controller unit 300 to have a USB (Universal Serial Bus) I/F, not shown schematically, for making it possible for the image forming apparatus 111 to read and print image data stored in a flash memory card.

Figure 4:
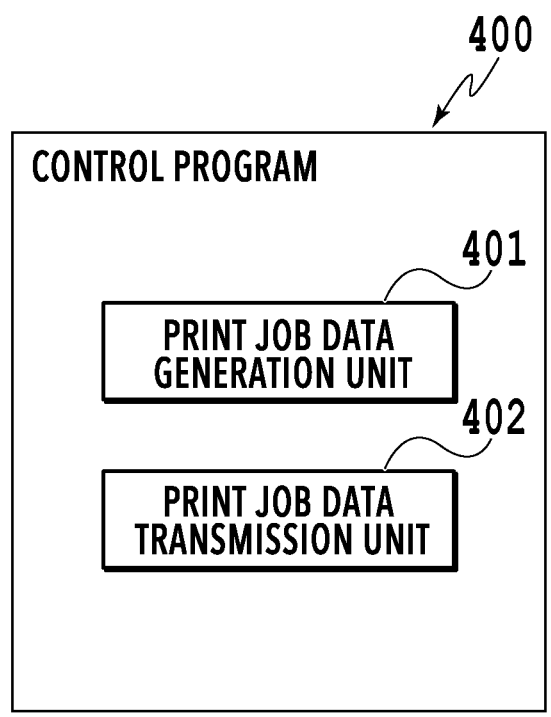
FIG. 4 is a function block diagram of a control program of the information processing terminal.

FIG. 4 is a function block diagram of a control program 400 stored in the auxiliary storage device 203 of the information processing terminal 101. It is possible for the CPU 201 to read each of control modules making up a print job data generation unit 401 and a print job data transmission unit 402 in the control program 400 from the auxiliary storage device 203 onto the RAM 202 and to execute the control modules.

The print job data generation unit 401 generates print job data that the image forming apparatus 111 can interpret by instructions from an arbitrary drawing program, such as a text editor. The print job data transmission unit 402 transmits the print job data generated by the print job data generation unit 401 to the image forming apparatus 111 as a print job. The functions included in the control program 400 are not limited to those functions described above.

Figure 5:
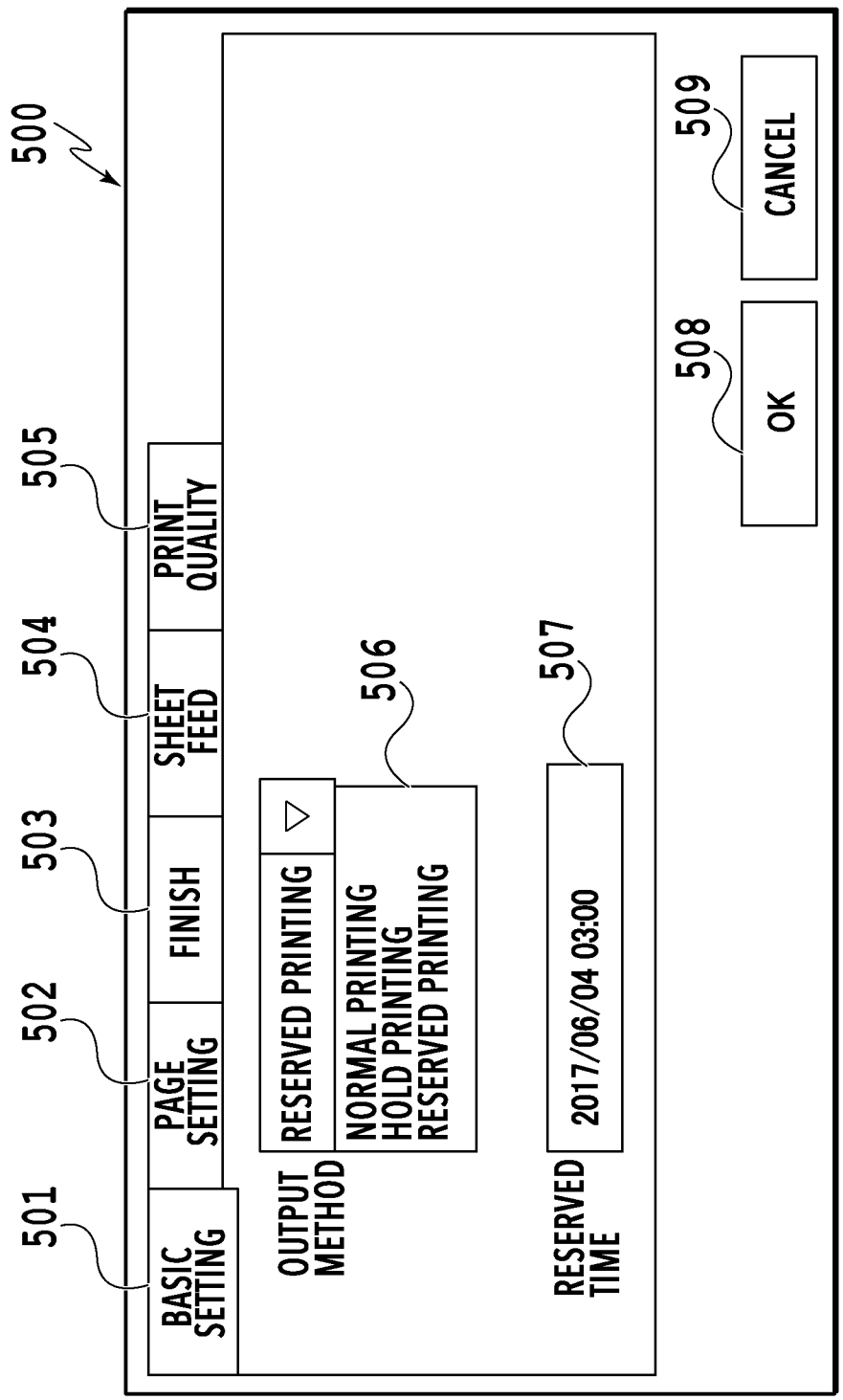
FIG. 5 is a diagram showing an example of a print setting specification screen.

FIG. 5 shows an example of a print setting specification screen 500 displayed on the display device 204 of the information processing terminal 101. The print setting specification screen 500 is displayed by the print job data generation unit 401. It is possible for a user to specify a print setting of print job data on the print setting specification screen 500. The print setting specification screen 500 has a Basic setting tab 501, a Page setting tab 502, a Finish tab 503, a Sheet feed tab 504, and a Print quality tab 505. On the print setting specification screen 500 shown in FIG. 5, the Basic setting tab 501 is selected by a user.

Output method 506 indicates a method of outputting print job data of the image forming apparatus 111. It is possible for a user to specify a method of outputting print job data from a plurality of output methods displayed in a list format.

In the present embodiment, it is possible for a user to select "normal printing", "hold printing", or "reserved printing" as an output method. The output method "normal printing" is an output method of performing printing each time the image forming apparatus 111 receives print job data. The output method "hold printing" is an output method in which print job data received by the image forming apparatus 111 is temporarily stored and printing is performed in the case where a user gives instructions to print the print job data on the image forming apparatus 111. The output method "reserved printing" is an output method in which the image forming apparatus 111 performs printing of received print job data at a specified start time. In the case of selecting "reserved printing", a user also specifies Reserved time 507. The reserved time may be an absolute time or a time relative to the current time. In the present embodiment, it is assumed that a user specifies an absolute time as Reserved time 507. Reserved time 507 is a start time at which printing of print job data is started in the image forming apparatus 111.

In the case where a user presses down an OK button 508 on the print setting specification screen 500, the print job data generation unit 401 generates print job data in accordance with the specified print setting. The print job data transmission unit 402 transmits the print job data generated by the print job data generation unit 401 to the image forming apparatus 111 as a print job.

In the case where a user presses down a Cancel button 509 on the print setting specification screen 500, the print job data generation unit 401 closes the print setting specification screen 500 without generating print job data.

It is possible for a user to specify the number of print copies, the staple setting, the punch setting, the sheet feed setting, the resolution setting, the print color, and so on by selecting the other tabs 502 to 505 on the print setting specification screen 500.

Figure 6:
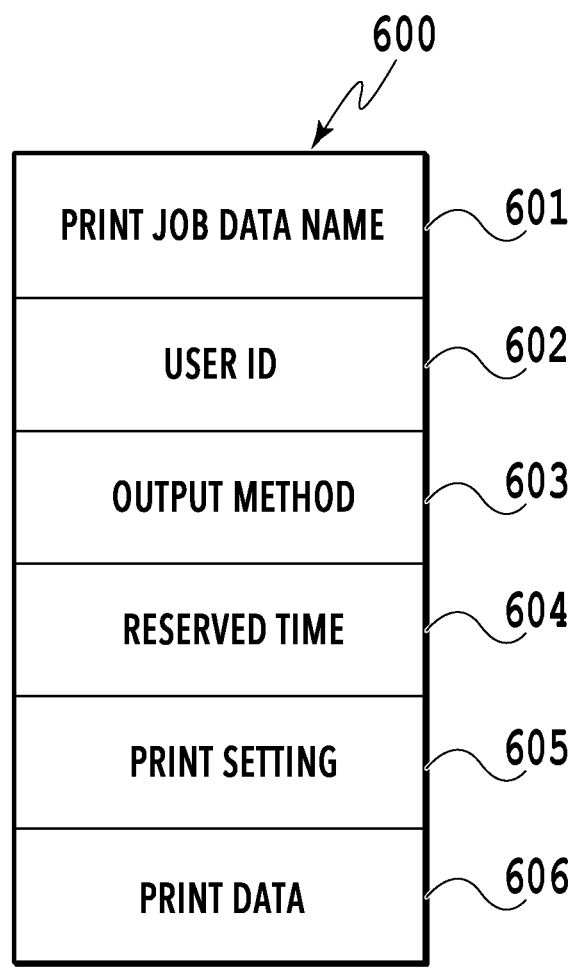
FIG. 6 is a diagram showing a configuration example of print job data.

FIG. 6 shows a configuration example of print job data 600 that is generated by the print job data generation unit 401. A print job data name 601 is the data name of the print job data 600. A user ID 602 is the user ID for specifying the user using the information processing terminal 101. It may also be possible for a user to explicitly specify the user ID 602 on the print setting specification screen 500. An output method 603 is the output method specified by a user on the print setting specification screen 500. That is, in the present embodiment, as the output method 603, "normal printing", "hold printing", or "reserved printing" is specified. A reserved time 604 is the reserved time specified by a user on the print setting specification screen 500. A print setting 605 is the print setting, such as the number of print copies, the staple setting, the punch setting, the sheet feed setting, the resolution setting, and the print color. Print data 606 is the print data specified from an arbitrary drawing program, such as a text editor.

The print job data generation unit 401 generates the print job data 600 made up as described above and the print job data transmission unit 402 transmits the print job data 600 to the image forming apparatus 111 as a print job.

Figure 7:
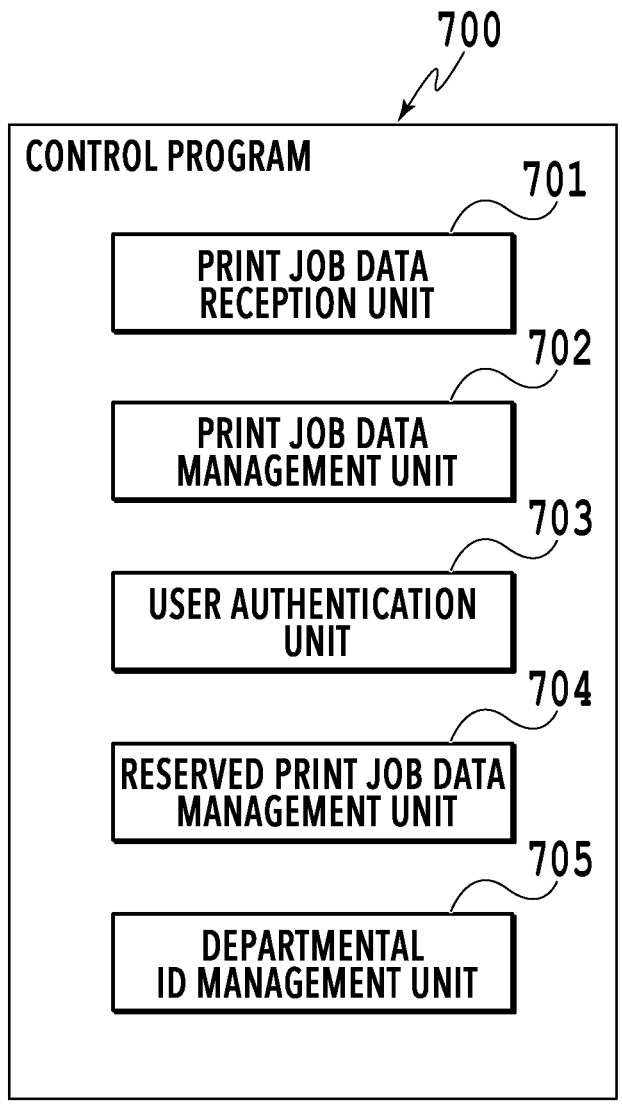
FIG. 7 is a function block diagram of a control program of the image forming apparatus.

FIG. 7 is a function block diagram of a control program 700 stored in the auxiliary storage device 303 of the image forming apparatus 111. It is possible for the CPU 301 to read control modules making up each of function units 701 to 705 in the control program 700 from the auxiliary storage device 303 onto the RAM 302 and execute the control modules.

The print job data reception unit 701 receives the print job data 600 (that is, print job) from the information processing terminal 101 via the network I/F 306 and delivers the received print job data 600 to the print job data management unit 702. The print job data management unit 702 analyzes the print job data 600 received from the information processing terminal 101 and performs transmission of the print job data 600 stored in the auxiliary storage device 303 to the printing device 307 via the device I/F 310. The user authentication unit 703 authenticates and specifies a user who uses the image forming apparatus 111. A user inputs user authentication information that the user authentication unit 703 uses from the operation unit 304. The reserved print job data management unit 704 manages print job data for which reserved printing is set as the output method 603 (that is, reserved print job) of the print job data managed by the print job data management unit 702. The departmental ID management unit 705 manages a user who uses the image forming apparatus 111 for each department (that is, for each group of a user). Further, the departmental ID management unit 705 manages a limit to the number of output sheets and the like for each department ID by using the department ID allocated to each department. It is possible for the departmental ID management unit 705 to perform management of a user by causing a user who uses the image forming apparatus 111 to belong to one of the departments. The functions included in the control program 700 are not limited to the functions described above.

Figure 8:
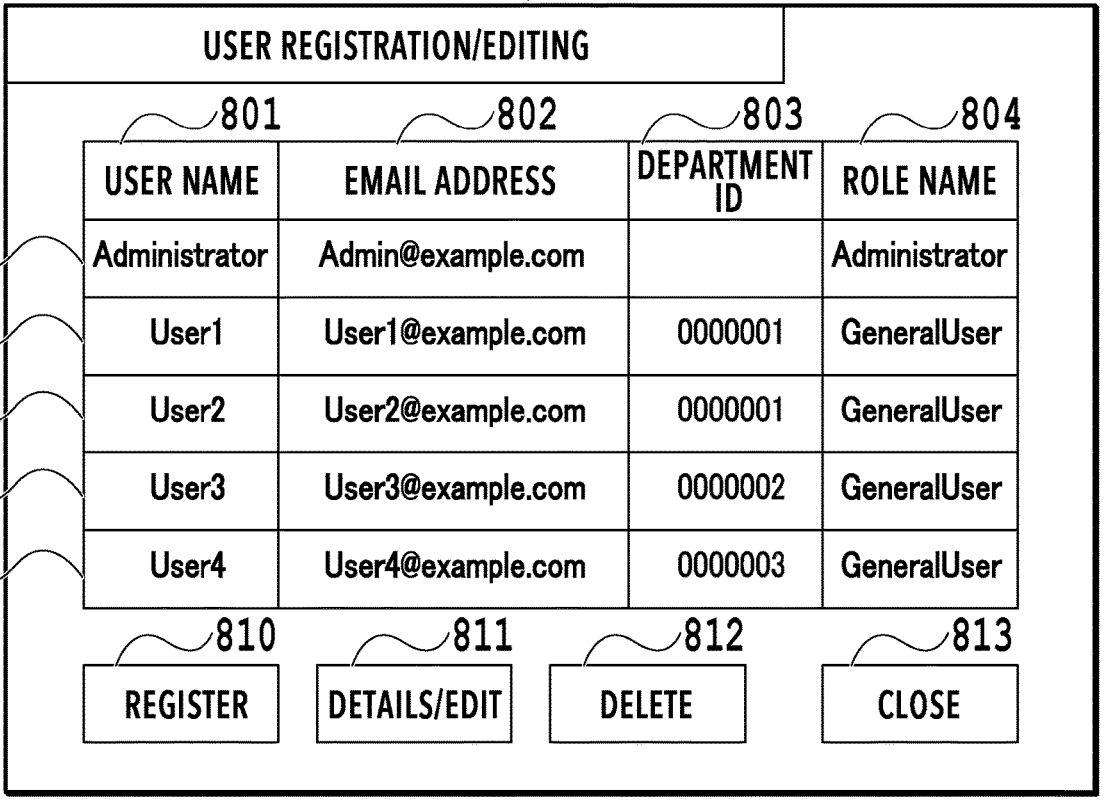
FIG. 8 is a diagram showing an example of a User registration/editing screen.

FIG. 8 is a diagram showing an example of a User registration/editing screen 800 in the image forming apparatus 111. The User registration/editing screen 800 is displayed on the operation unit 304 by the CPU 301 via the operation unit I/F 305. User name 801 indicates the user name of a user who uses the image forming apparatus 111. The user name is used as a user ID. Email address 802 indicates the email address of a user identified by Use name 801. Department ID 803 indicates the department ID of a department to which a user identified by User name 801 belongs. Role name indicates the authority given to a user identified by User name 801. For example, the role name of a user having the administrator authority of the image forming apparatus 111 is "Administrator" and the role name of a general user is "GeneralUser". In the case where a Register button 810 is pressed down by a user, a user information registration screen (not shown schematically) for registering a new user is displayed. Further, by a user pressing down a Detail/edit button 811 after selecting one of already-registered users 805 to 809, a user information editing screen (not shown schematically) capable of displaying details of registration information on the selected user and editing registration contents is displayed. By a user pressing down a Delete button 812 after selecting one of already-registered users 805 to 809, the registration information on the selected user is deleted. In the case where a Close button 813 is pressed down by a user, the User registration/editing screen 800 is closed. It is desirable that the operation on this screen can be performed only by a user having the administrator authority.

FIG. 9 is a diagram showing an example of a user information management table 900 for managing registered user information. The user information management table 900 is stored in the auxiliary storage device 303 or the RAM 302 and it is possible for the user authentication unit 703 to read and write information at any timing. In the user information management table 900 in FIG. 9, already-registered users 905 to 909 are shown. The contents of information stored in the user information management table 900 are the same as those explained with reference to FIG. 8, and therefore, detailed explanation is omitted.

Figure 10:
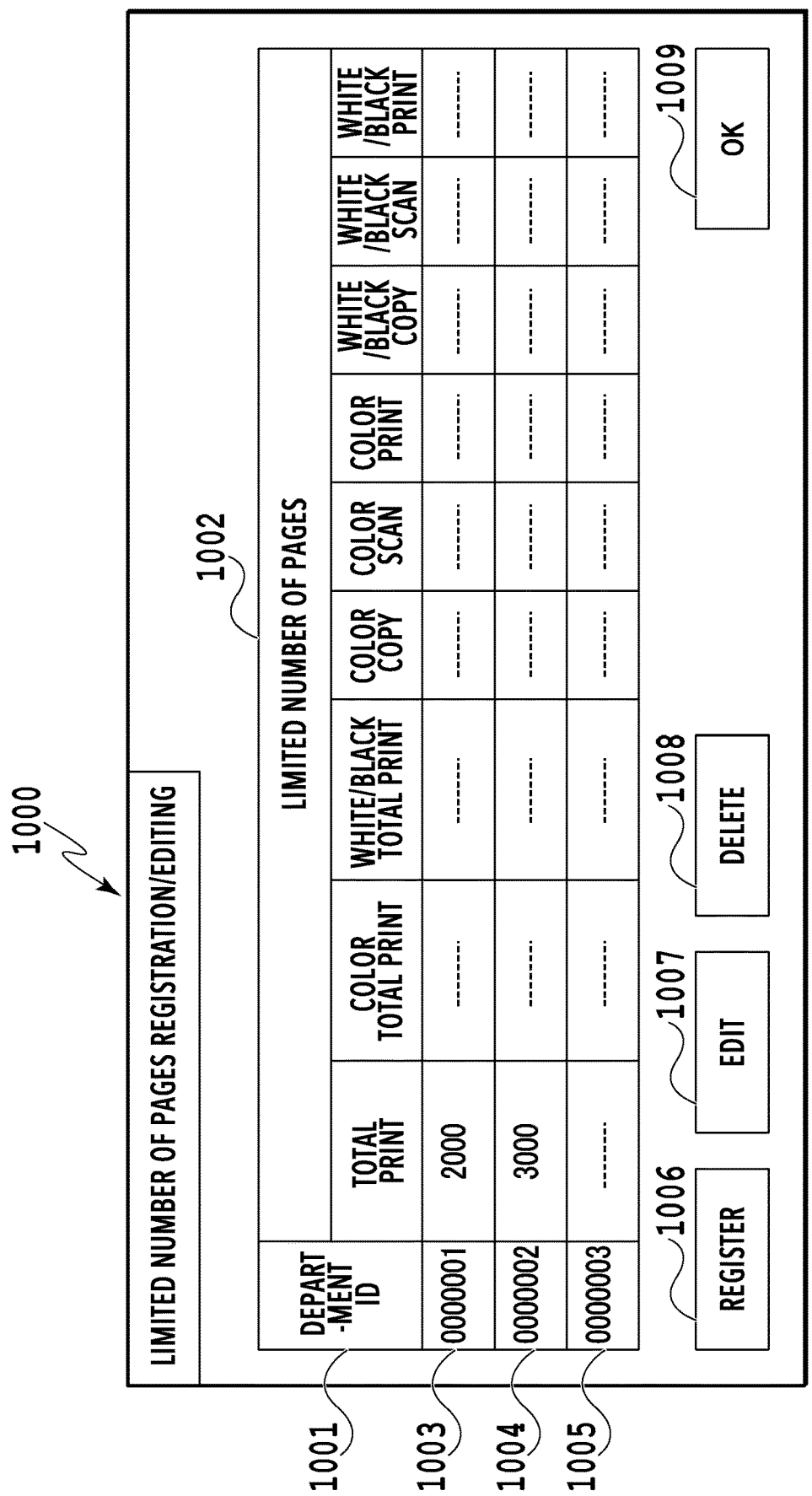
FIG. 10 is a diagram showing an example of a Limited number of pages registration/editing screen.

FIG. 10 is a diagram showing an example of a Limited number of pages registration/editing screen 1000 in the image forming apparatus 111. The Limited number of pages registration/editing screen 1000 is displayed on the operation unit 304 by the CPU 301 via the operation unit I/F 305. Department ID 1001 indicates the department ID of a department registered in the image forming apparatus 111. Limited number of pages 1002 indicates a limit to the number of output pages (that is, the upper limit value of the number of output pages) that is set for each department. In more detail, Limited number of pages 1002 indicates Total print, which is the limited number of pages obtained by adding up all the numbers of output pages of color printing and monochrome printing. Further, Limited number of pages 1002 indicates Total print, which is the limited number of pages obtained by adding up the numbers of output pages of color printing, and White/black total print, which is the limited number of pages obtained by adding up the numbers of output pages of monochrome printing. Furthermore, Limited number of pages 1002 indicates the limited number of pages of each of color printing and monochrome printing for each function of copy, scan, and print. These items are an example. That is, on the Limited number of pages registration/editing screen 1000, only part of these items may be displayed or the limited number of pages in another function, such as hold printing and FAX, may be displayed. In department 1003 (department whose Department ID 1001 is "0000001"), the number of output pages of Total print is limited to 2000 and the other items are not limited. In department 1004 (department whose Department ID 1001 is "0000002"), the number of print pages of Total print is limited to 3000 and the other items are not limited. In department 1005 (department whose Department ID 1001 is "0000003"), the number of output pages is not limited in all the items. In the case where a Register button 1006 is pressed down by a user, a department information registration screen (not shown schematically) for registering a new department is displayed. On the department information registration screen, it is possible for a user to register a new department ID, the limited number of pages, and so on. Further, by a user selecting one of already-registered departments 1003 to 1005 and then pressing down an Edit button 1007, a department information editing screen (not shown schematically) capable of displaying details of registered information on the selected department and editing the registered contents is displayed. On the department information editing screen, it is possible for a user to edit a registered department ID, the limited number of pages, and so on. By a user selecting one of registered departments 1003 to 1005 and then pressing down a Delete button 1008, the registered information on the selected department is deleted. By a user pressing down an OK button 1009, the Limited number of pages registration/editing screen is closed. It is desirable that the operation on this screen can be performed only by a user having the administrator authority.

The number of pages means the number of pages of print job data printed by the printing device 307. In the case where the printing device 307 prints one page of the print job data, the number of pages is counted as 1. For example, in the case where layout printing is performed in which two pages of the print data 606 of the print job data 600 are reduced and laid out in one page, the printing device 307 prints only one page, and therefore, the number of pages is counted as 1. On the other hand, in the case where both-side printing is performed, the printing device 307 prints a total of two pages, that is, the surface and the backside, and therefore, the number of pages is counted as 2. The count method of the number of pages such as this is an example and the method is not limited to this. For example, the number of pages in the case where the printing device 307 performs printing of the A4 size may be counted as 1 and the number of pages in the case where the printing device 307 performs printing of the A3 size may be counted as 2.

Figure 11:
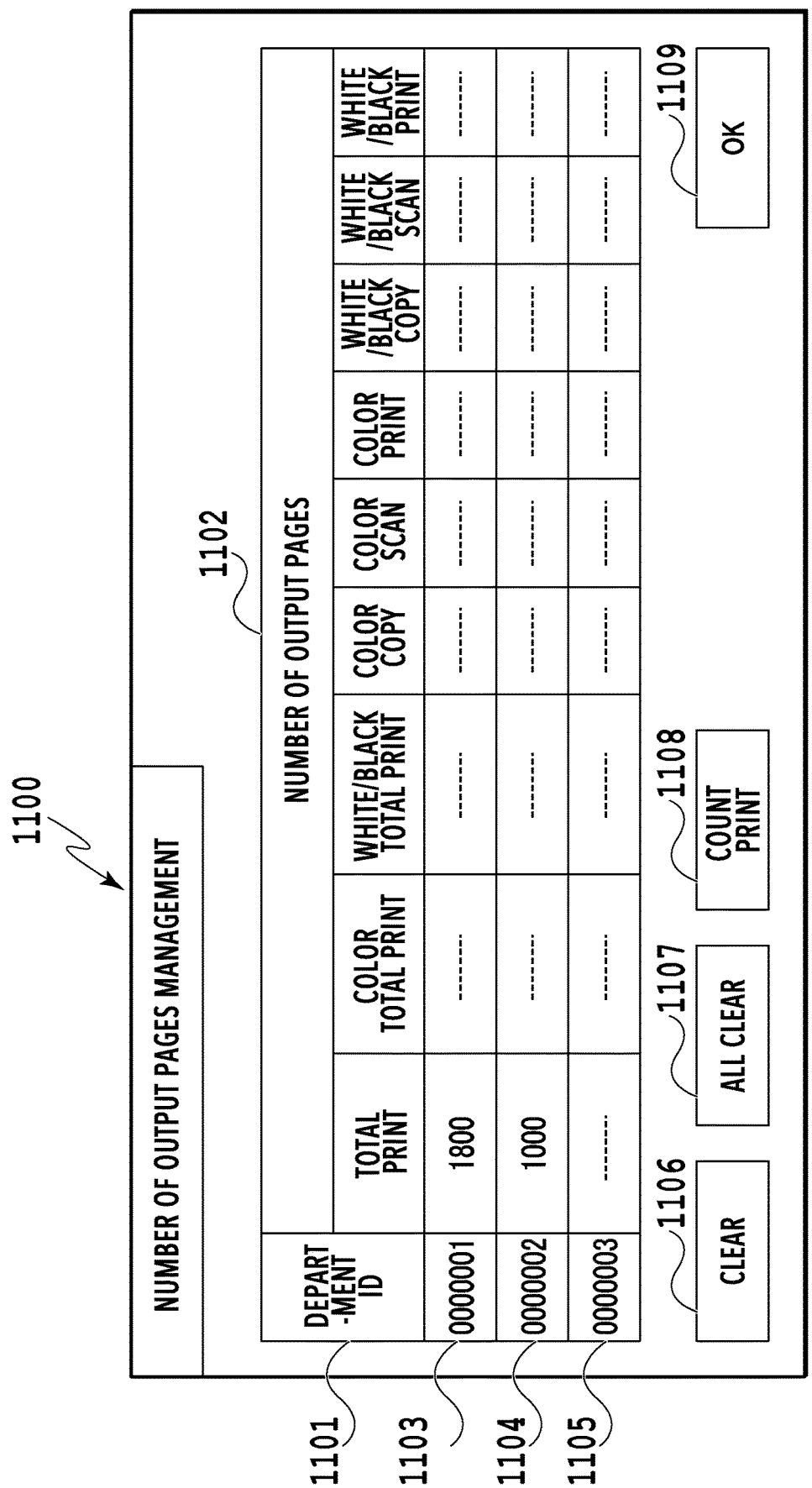
FIG. 11 is a diagram showing an example of a Number of output pages management screen.

FIG. 11 is a diagram showing an example of a Number of output pages management screen 1100 in the image forming apparatus 111. The Number of output pages management screen 1100 is displayed on the operation unit 304 by the CPU 301 via the operation unit I/F 305. Department ID 1101 indicates the department ID of a department registered in the image forming apparatus 111. Number of output pages 1102 displays the number of output pages for each department, which have been output up to now. Each item of Number of output pages 1102 is the same as each item displayed on the Limited number of pages registration/editing screen 1000, and therefore, detailed explanation is omitted. In department 1103 (department whose Department ID 1101 is "0000001"), the number of output pages of Total print is 1800 and the number of output pages of the other items is not displayed. The reason is that the limited number of pages is not set in the other items as shown in FIG. 10. In department 1104 (department whose Department ID 1101 is "0000002"), the number of output pages of Total print is 1000 and the number of output pages of the other items is not displayed. The reason is similarly that the limited number of pages is not set in the other items. In department 1105 (department whose Department ID 1101 is "0000003"), the number of output pages is not displayed in all the items. The reason is that the limited number of pages is not set in all the items. By a user selecting one of departments 1103 to 1105 and then pressing down a Clear button 1106, all the numbers of output pages of the selected department is cleared to 0. Further, by a user pressing down an All clear button 1107, all the numbers of output pages of all the departments are cleared to 0. By a user pressing down a Count print button 1108, all the department IDs and all the numbers of output pages thereof are notified to the printing device 307 via the device I/F 310 and printed. By a user pressing down an OK button 1109, the Number of output pages management screen 1100 is closed. It is desirable that the operation on this screen can be performed only by a user having the administrator authority.

Figure 12:
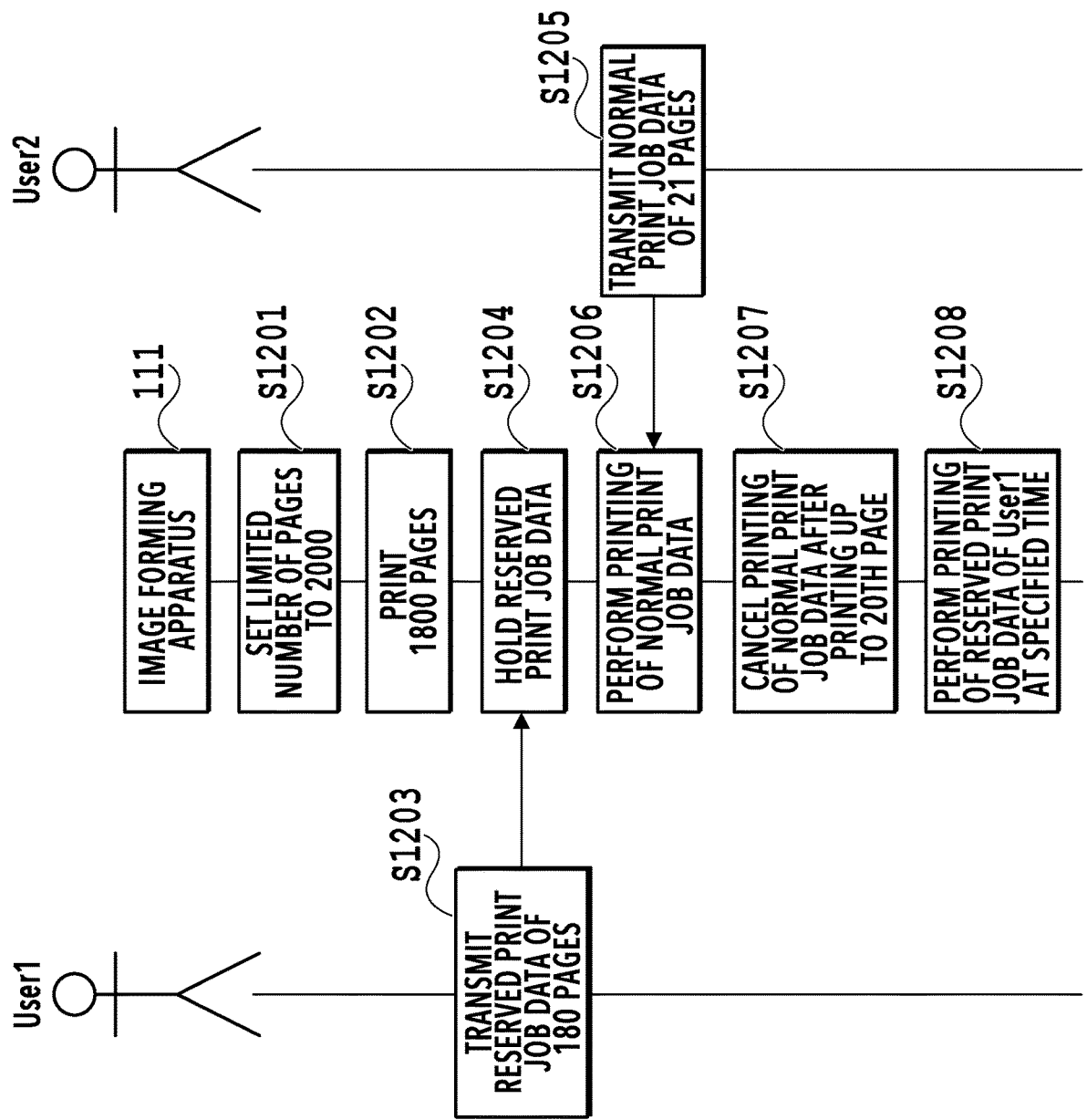
FIG. 12 is a sequence diagram explaining an outline of printing processing.

FIG. 12 is a sequence diagram explaining an outline of printing processing in the image forming apparatus 111. In FIG. 12, as an example, first, the image forming apparatus 111 receives reserved print job data (that is, reserved print job) of 180 pages from User1 and then, receives normal print job data (that is, normal print job) of 21 pages from User2. It is assumed that both User1 and User2 belong to the same department whose department ID is "0000001".

At step S1201, the image forming apparatus 111 receives the set value of the limited number of pages of the department specified by a user input from the Limited number of pages registration/editing screen 1000 displayed on the operation unit 304 and sets the limited number of pages. The image forming apparatus 111 sets the limited number of pages to, for example, 2000 in accordance with a user input.

At step S1202, the image forming apparatus 111 performs printing of one piece or a plurality of pieces of print job data received from one or a plurality of users belonging to the department for which the limited number of pages is set at step S1201. The image forming apparatus 111 performs, for example, printing of 1800 pages in total within the limited number of pages. As a result of this, the count of the number of output pages of the department becomes 1800.

At step S1203, User1 transmits reserved print job data of 180 pages to the image forming apparatus 111 from the information processing terminal.

At step S1204, the image forming apparatus 111 holds the received reserved print job data. That is, the image forming apparatus 111 stores the received reserved print job data in the auxiliary storage device 303. As a result of this, the number of reserved pages of the department becomes 180.

At step S1205, User2 transmits normal print job data of 21 pages to the image forming apparatus 111 from the information processing terminal. The information processing terminal that User2 uses may be the same as or different from the information processing terminal that User1 uses at step S1203.

At step S1206, the image forming apparatus 111 performs printing of the received normal print job data. In the image forming apparatus 111, the reserved print job data of 180 pages is held, and therefore, it is possible for the image forming apparatus 111 to print only 20 sheets (2000-1800-180). Because of this, at step S1207, the image forming apparatus 111 cancels printing after printing up to the 20th page of the normal print job data.

At step S1208, the image forming apparatus 111 performs printing of the reserved print job data at the start time specified for the reserved print job data received from User1. The image forming apparatus 111 performs another print job so that the limited number of pages is not exceeded by taking into consideration the number of pages of the reserved print job data until the start time of the reserved print job data is reached, and therefore, it is possible to print all the pages of the reserved print job data. That is, the image forming apparatus 111 counts the number of print pages of the reserved print job data before performing printing of the reserved print job data. By doing so, it is possible for the image forming apparatus 111 to complete the reserved print job normally.

In the following, printing processing in the image forming apparatus 111 is explained in detail.

(Initialization Processing to Hold Processing)

Here, processing from initialization processing to hold processing of a reserved print job in the image forming apparatus 111 is explained. Further, for simplification of explanation, management of the limited number of pages, the number of output pages, and the number of reserved pages is explained by taking only Total print as a target. As explained in relation to the Limited number of pages registration/editing screen 1000, it may also be possible to take Color total print, White/black total print, and so on as a management target.

FIG. 13A to FIG. 13F show examples of a number of pages management table for explaining management of the limited number of pages, the number of output pages, and the number of reserved pages. The print job data management unit 702 uses a number of pages management table 1300 including Limited number of pages 1302, Number of output pages 1303, and Number of reserved pages 1304 for each Department ID 1301. The number of pages management table 1300 is stored in the auxiliary storage device 303 or the RAM 302 and the print job data management unit 702 reads and writes information at any timing. Departments 1305 to 1307 indicate information on each department managed by the departmental ID management unit 705.

Figure 14:
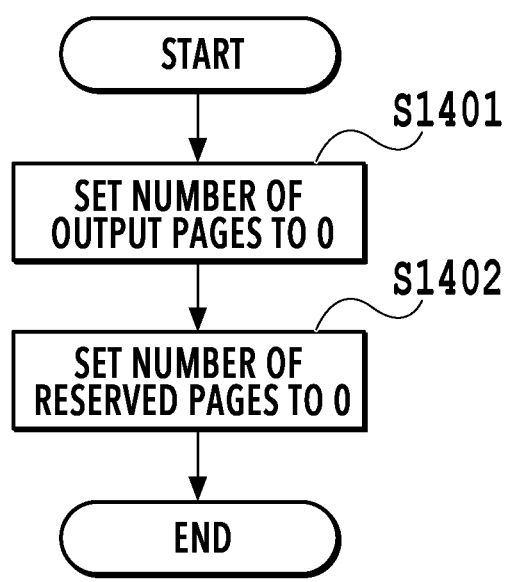
FIG. 14 is a flowchart of initialization processing of the number of output pages and the number of reserved pages.

FIG. 14 shows a flowchart of initialization processing of the number of output pages and the number of reserved pages in the image forming apparatus 111. Each step of the flowchart is performed by a program for performing initialization processing being loaded onto the RAM 302 and being executed by the CPU 301.

The initialization processing of the number of output pages and the number of reserved pages is processing to set the number of output pages of the print job data, which are output by the image forming apparatus 111 before the initialization processing is performed, and the number of print pages (that is, the number of reserved pages) of the print job data reserved in the image forming apparatus 111 to 0. The initialization processing is performed at the time of activation of the image forming apparatus 111 or based on instructions from a user having the administrator authority of the image forming apparatus 111.

At step S1401, the departmental ID management unit 705 sets Number of output pages 1303 of each department. The number of pages management table 1300 in FIG. 13A shows the state where after Number of output pages 1303 is set to 0, print job data of a total of 1800 sheets is printed in department 1305 and print job data of a total of 1000 sheets is printed in department 1306. That is, a state where one or a plurality of users belonging to department 1305 prints print job data of a total of 1800 sheets and one or a plurality of users belonging to department 1306 prints print job data of a total of 1000 sheets.

Next, at step S1402, the departmental ID management unit 705 sets Number of reserved pages 1304 to 0. The number of pages management table 1300 in FIG. 13A shows the state where Number of reserved pages 1304 of each department is set to 0.

As explained above, in the initialization processing, Number of output pages 1303 and Number of reserved pages 1304 of each department in the number of pages management table 1300 are initialized to 0.

Figure 15:
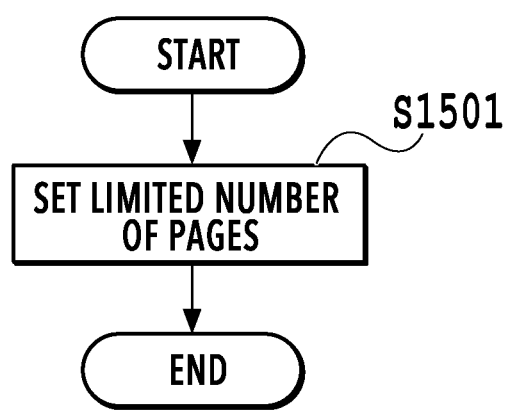
FIG. 15 is a flowchart of limited number of pages setting processing.

FIG. 15 is a flowchart of limited number of pages setting processing in the image forming apparatus 111. Each step of the flowchart is performed by a program for performing the limited number of pages setting processing being loaded onto the RAM 302 and being executed by the CPU 301.

It is possible to perform the setting of the limited number of pages of a department that is newly registered from a department information registration screen (not shown schematically) that is displayed by a user pressing down the Register button 1006 on the Limited number of pages registration/editing screen 1000. Further, it is possible to perform the setting of the limited number of pages of an already-registered department from a department information editing screen (not shown schematically) that is displayed by a user pressing down the Edit button 1007 of the Limited number of pages registration/editing screen 1000.

At step S1501, the departmental ID management unit 705 receives the set value of the limited number of pages input by a user and sets the received set value to Limited number of pages 1302 of the number of pages management table 1300. The number of pages management table 1300 in FIG. 13A shows the state where Limited number of pages 1302 of the department 1305 is set to 2000 and Limited number of pages 1302 of department 1306 is set to 3000. Limited number of pages 1302 of department 1307 is not set.

As explained above, in the limited number of pages setting processing in the image forming apparatus 111, to Limited number of pages 1302 of the number of pages management table 1300, a set value input by a user is set.

Figure 16:
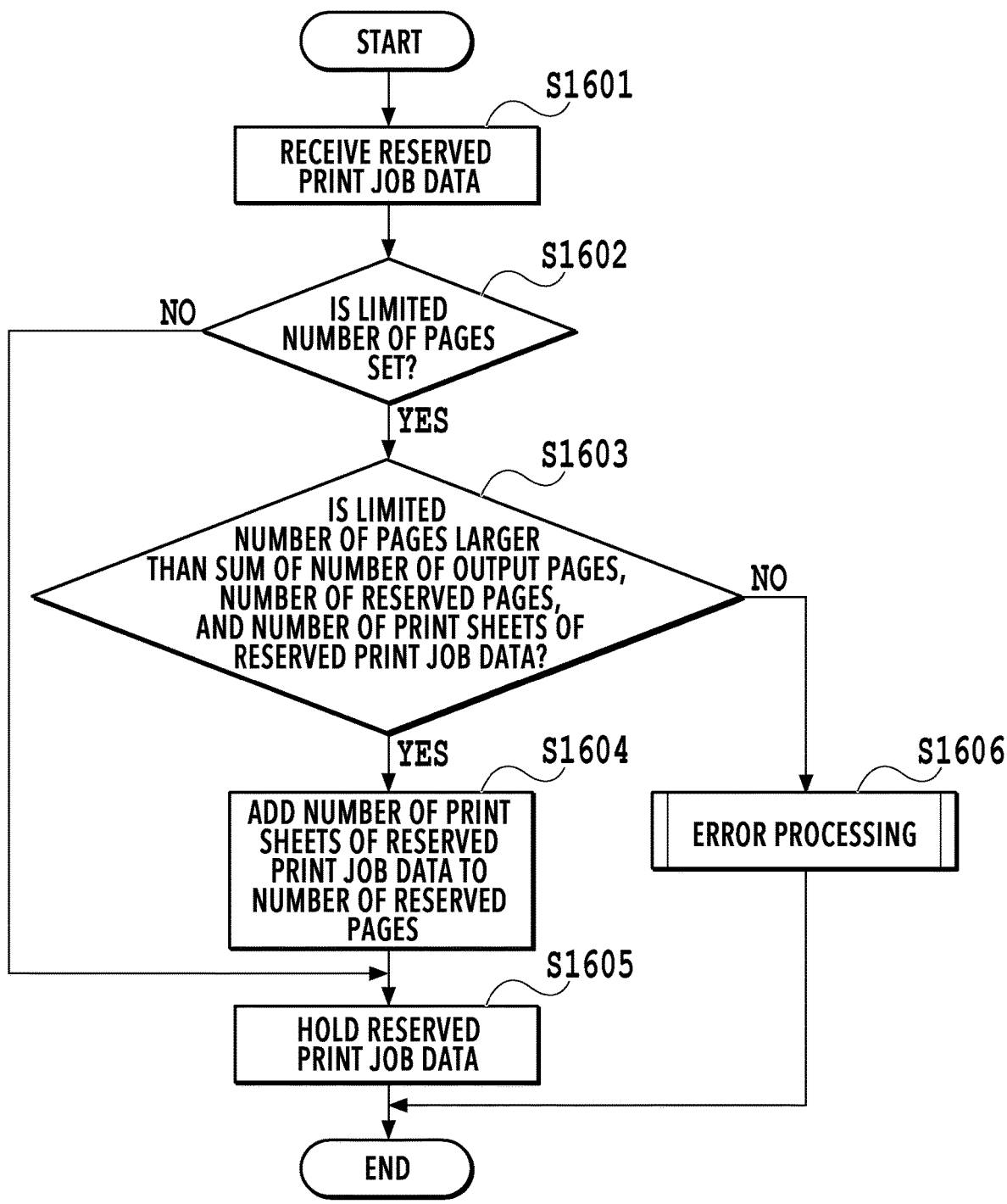
FIG. 16 is a flowchart of hold processing of a reserved print job.

FIG. 16 shows a flowchart of hold processing of a reserved pint job (that is, reserved print job data) in the image forming apparatus 111. Each step of the flowchart is performed by a program for performing the hold processing being loaded onto the RAM 302 and being executed by the CPU 301.

At step S1601, the print job data reception unit 701 receives a reserved print job from the information processing terminal 101 via the network I/F 306.

At step S1602, the departmental ID management unit 705 refers to the number of pages management table 1300 and determines whether or not the limited number of pages is set for the received reserved print job. Specifically, first, the departmental ID management unit 705 specifies the department ID of a department to which a user belongs from the user information management table 900 based on the user ID of the reserved print job data. Then, the departmental ID management unit 705 determines whether Limited number of pages 1302 is set in the number of pages management table 1300 for the specified department ID. In the case where the limited number of pages is set, the processing advances to step S1603 and in the other cases, the processing advances to step S1605.

At step S1603, the departmental ID management unit 705 determines whether or not the sum of Number of output pages 1303 of the department to which a user belongs, who is specified at step S1602, Number of reserved pages 1304, and the number of print sheets of the received reserved print job data is smaller than Limited number of pages 1302. In the case where the sum is smaller than Limited number of pages 1302, the processing advances to step S1604 and in the case where the sum exceeds Limited number of pages 1302, the processing advances to step S1606. For example, an example is explained in which reserved print job data whose user ID 602 is User1 is received. The user authentication unit 703 refers to the user information management table 900 and identifies that Department ID 903 of user information 906 whose User name 901 is User1 is "0000001". Next, the departmental ID management unit 705 refers to the number of pages management table 1300 and identifies that Limited number of pages 1302 of the department whose Department ID 1301 is "0000001" is 2000, Number of output pages 1303 is 1800, and Number of reserved pages 1304 is 0. In the case where the number of print pages of the received print job data is 180, the sum of the number of output pages, the number of reserved pages, and the number of print pages of the received print job data is 1980 (1800+0+180), and therefore, it is determined that the sum does not exceeds the limited number of pages 2000. That is, it is determined that execution of printing of the reserved print job data is possible. Consequently, in this case, the processing advances to step S1604. On the other hand, in the case where the number of print pages of the received reserved print job data is 201, the sum of the number of output pages, the number of reserved pages, and the number of print pages of the received print job data is 2001 (1800+0+201), and therefore, it is determined that the sum exceeds the limited number of pages 2000. Consequently, in this case, the processing advances to step S1606.

At step S1604, the departmental ID management unit 705 adds the number of print pages of the reserved print job data to Number of reserved pages 1304 of the number of pages management table 1300. For example, in the case where the user ID 602 of the reserved print job data is User1 (that is, department ID is "0000001") and the number of print pages is 180, 180 is set to Number of reserved pages 1304 of department 1305 of the number of pages management table 1300. The number of pages management table 1300 in FIG. 13B shows the state where Number of reserved pages 1304 of department 1305 is set to 180.

At step S1605, the print job data management unit 702 saves the received reserved print job data and terminates the processing (that is, holds the reserved print job). In more detail, the print job data management unit 702 saves the reserved print job data in the auxiliary storage device 303 and adds the output method to a held print job list shown in FIG. 17, to be described later, as "reserved printing".

At step S1606, the print job data management unit 702 performs error processing and terminates the processing. In this case, the print job data management unit 702 cannot complete the printing of the received reserved print job data normally, and therefore, it may also be possible to delete the reserved print job data as error processing. Further, it may also be possible for the print job data management unit 702 to return information indicating that holding the reserved print job data has failed to the information processing terminal 101 having transmitted the reserved print job data. Furthermore, in the case where Email address 902 of the user having transmitted the reserved print job data is registered in the user information management table 900, it may also be possible for the print job data management unit 702 to return information indicating that holding the reserved print job data has failed to the email address.

FIG. 17 shows an example of a held print job list 1700 for managing a print job saved in the auxiliary storage device 303 by the print job data management unit 702. The held print job list 1700 is stored in the auxiliary storage device 303 or the RAM 302 and the print job data management unit 702 reads and writes information at any timing. In the held print job list 1700, Date and time of reception 1701 indicates the date and time of reception of the print job data 600 by the print job data reception unit 701. User ID 1702 indicates the user ID 602 included in the received print job data 600. Print job data name 1703 indicates the print job data name 601 included in the received print job data 600. Output method 1704 indicates the output method 603 set in the received print job data 600. In the case where the output method 603 of the print job data 600 is reserved printing, Output method 1704 of the held print job list 1700 is saved as "reserved printing". In the case where the output method 603 of the print job data 600 is hold printing, Output method 1704 of the held print job list 1700 is saved as "hold". Reserved time 1705 indicates the reserved time 604 included in the received print job data 600. For the print job data 600 in which the output method 603 is set as hold printing, as Reserved time 1705, for example, NULL is set. Storage location 1706 indicates the storage location of the print job data 600 saved in the auxiliary storage device 303 by the print job data management unit 702. Storage location 1706 is represented by, for example, a path of the folder in which the print job data 600 is saved. By Print job data name 1703 and Storage location 1706, it is possible for the print job data management unit 702 to uniquely specify the print job data 600 saved in the auxiliary storage device 303. In the held print job list 1700, print job data 1711 to 1716 held in the image forming apparatus 111 is shown.

As explained above, the hold processing of a reserved print job in the image forming apparatus 111 is performed. That is, the reserved print job is saved in the auxiliary storage device 303 and managed in the held print job list 1700 in the case where printing is possible within the limited number of pages. By doing so, the image forming apparatus 111 manages the count relating to the limit of the number of print pages.

(Deletion Processing of Reserved Print Job)

Here, deletion processing of a reserved print job held in the image forming apparatus 111 is explained.

Figure 18:
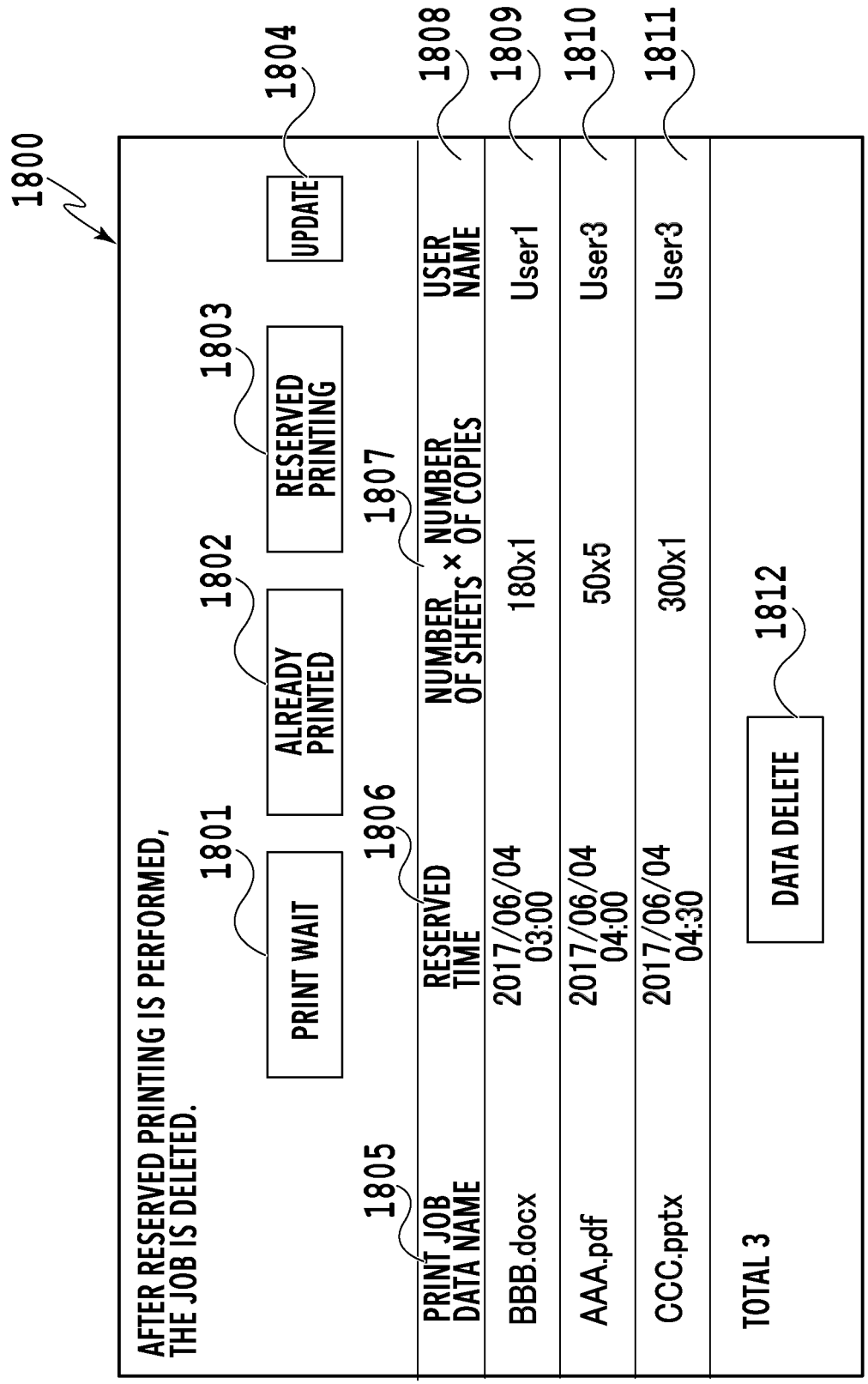
FIG. 18 is a diagram showing an example of a print job management screen.

FIG. 18 shows an example of a print job management screen 1800 in the image forming apparatus 111. The print job management screen 1800 is displayed on the operation unit 304 after a user who uses the image forming apparatus 111 is authenticated. That is, the operation unit 304 functions as a print job management screen display unit.

First, the user authentication unit 703 displays a user authentication screen (not shown schematically) on the operation unit 304 and a user inputs a user ID and a password (that is, user authentication information) to the displayed user authentication screen. The user authentication unit 703 performs user authentication processing by using the user ID and the password that are input by the user.

Next, in response to instructions from a user, the CPU 301 displays the print job management screen 1800 on the operation unit 304 via the operation unit I/F 305. In the case where a user presses down a Print wait button 1801, the print job data management unit 702 generates a list of print jobs whose Output method 1704 is "hold" from the held print job list 1700 shown in FIG. 17 and displays the list on the print job management screen 1800. In the case where a user presses down an Already printed button 1802, the print job data management unit 702 generates a list of print jobs performed in the past and displays the list on the print job management screen 1800. In the case where a user presses down a Reserved print button 1803, the print job data management unit 702 generates a list of print jobs whose Output method 1704 is "reserved printing" from the held print job list 1700 shown in FIG. 17 and displays the list on the print job management screen 1800. On this screen, the reserved print job data management unit 704 manages processing relating to a reserved print job. In the case where a user presses down an Update button 1804, the reserved print job data management unit 704 acquires a print job whose Output method 1704 is "reserved printing" from the held print job list 1700 in FIG. 17 and updates the display on the print job management screen 1800. Print job data name 1805 displays Print job data name 1703 of the held print job list 1700 in FIG. 17. Reserved time 1806 displays Reserved time 1705 of the held print job list 1700 in FIG. 17. Number of sheets×number of copies 1807 is displayed by the reserved print job data management unit 704 analyzing the number of sheets and the number of copies of the reserved print job data. User name 1808 displays User ID 1702 of the held print job list 1700 in FIG. 17. In the case where a user selects one of reserved print jobs 1809 to 1811 and then presses down Data delete button 1812, the reserved print job data management unit 704 deletes the selected reserved print job.

Figure 19:
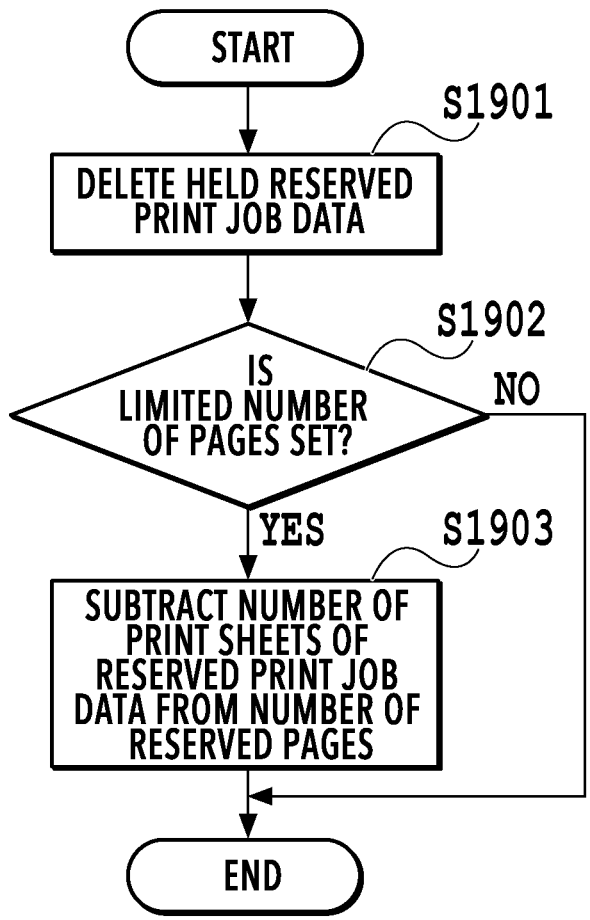
FIG. 19 is a flowchart of deletion processing of a reserved print job.

FIG. 19 shows a flowchart of deletion processing of a reserved print job. Each step is performed by a program for performing deletion processing of a reserved print job being loaded onto the RAM 302 and being executed by the CPU 301. The flowchart in FIG. 19 is started by the Data delete button 1801 being pressed down after reserved print job 1809 whose total number of print pages (number of sheets× number of copies) is 180 is selected by a user on the print job management screen 1800 in FIG. 18. The number of pages management table 1300 is in the state shown in FIG. 13B.

At step S1901, the reserved print job data management unit 704 deletes held reserved print job data 1712 corresponding to selected reserved print job 1809 from the auxiliary storage device 303. Consequently, reserved print job 1809 is deleted also from the print job management screen 1800.

At step S1902, the departmental ID management unit 705 refers to the number of pages management table 1300 and determines whether or not the limited number of pages is set to the department to which User1 who is the user of deleted reserved print job 1809 belongs, that is, department 1305. In the case where the limited number of pages is set, the processing advances to step S1903 and in the other cases, the processing is terminated.

At step S1903, the departmental ID management unit 705 subtracts the number of print pages of deleted reserved print job 1809 from Number of reserved pages of the number of pages management table 130 and terminates the processing. Specifically, the number of print pages of reserved print job 1809 is 180, and therefore, 180 is subtracted from Number of reserved pages 1304 of department 1305 of the number of pages management table 1300. As a result of this, Number of reserved pages 1304 of department 1305 becomes 0. The number of pages management table 1300 in FIG. 13C shows the state after subtraction is performed so that Number of reserved pages 1304 of department 1305 becomes 0.

As explained above, the deletion processing of a reserved print job held in the image forming apparatus 111 is performed. The image forming apparatus 111 manages the count relating to the limit of the number of print pages by subtracting the number of print pages of the reserved print job from the number of reserved pages accompanying the deletion of the reserved print job.

(Execution of Reserved Print Job)

The reserved print job held in the image forming apparatus 111 is performed in the case where the current time reaches the start time specified by a user (that is, reserved time) and the reserved print job data is printed. Here, processing in which the image forming apparatus 111 performs a reserved print job held in the image forming apparatus 111 and prints reserved print job data is explained.

Figure 20:
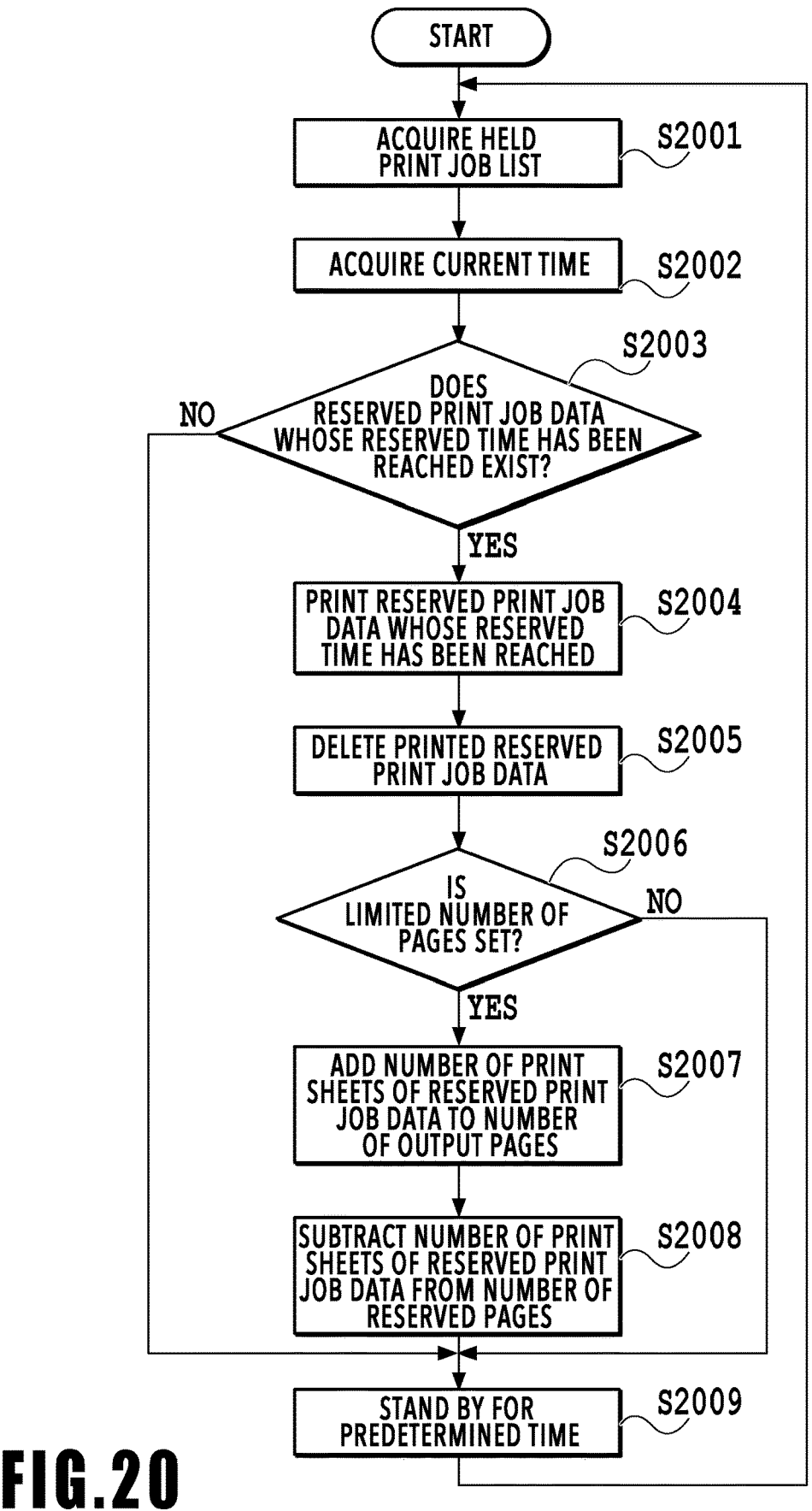
FIG. 20 is a flowchart of printing processing of a reserved print job.

FIG. 20 shows a flowchart of execution of a reserved print job, that is, printing processing of reserved print job data. Each step of the flowchart is performed by a program for performing printing processing being loaded onto the RAM 302 and being executed by the CPU 301.

In the printing processing of reserved print job data, the reserved print job data management unit 704 refers to the held print job list 1700 in FIG. 17 by periodic processing and prints reserved print job data whose reserved time has been reached. Alternatively, the aspect may be one in which the reserved print job data management unit 704 voluntarily prints reserved print job data in an interlocking manner with the timer 313 in the case where the reserved time is reached. The number of pages management table 1300 is in the state shown in FIG. 13B.

At step S2001, the reserved print job data management unit 704 starts periodic processing and acquires the held print job list 1700.

At step S2002, the reserved print job data management unit 704 acquires the current time from the timer 313. Here, for example, explanation is continued on the assumption that 2017 Jun. 4 03:00 is acquired as the current time.

At step S2003, the reserved print job data management unit 704 determines whether or not there exists reserved print job data whose reserved time has been reached from Reserved time 1705 of the held print job list 1700 and the acquired current time. In the case where it is determined that there exists reserved print job data whose reserved time has been reached, the processing advances to step S2004 and in the other cases, the processing advances to step S2009. In the case where the acquired current time is 2017 Jun. 4 03:00, the reserved time of reserved print job data 1712 has been reached, and therefore, it is determined that there exists reserved print job data whose reserved time has been reached.

At step S2004, the reserved print job data management unit 704 prints reserved print job data 1712 whose reserved time has been reached.

At step S2005, the reserved print job data management unit 704 deletes held reserved print job data 1712 from the auxiliary storage device 303.

At step S2006, the departmental ID management unit 705 refers to the number of pages management table 1300 in FIG. 13B and determines whether or not the limited number of pages is set to the department to which User1 who is the user of reserved print job data 1712 belongs, that is, department 1305. In the case where the limited number of pages is set, the processing advances to step S2007 and in the other cases, the processing advances to step S2009.

At step S2007, the departmental ID management unit 705 adds the number of print sheets of the reserved print job data to Number of output pages 1303. Specifically, the number of print pages of reserved print job data 1712 is 180, and therefore, 180 is added to Number of output pages 1303 of department 1305 of the number of pages management table 1300. As a result of addition, Number of output pages 1303 becomes 1980.

At step S2008, the departmental ID management unit 705 subtracts the number of print pages of the reserved print job data from Number of reserved pages 1304. Specifically, the number of print pages of reserved print job data 1712 is 180, and therefore, 180 is subtracted from Number of reserved pages 1304 of department 1305 of the number of pages management table 1300. As a result of subtraction, Number of reserved pages 1304 becomes 0. The number of pages management table 1300 in FIG. 13D shows the state after the number of print pages of reserved print job data 1712 is added to Number of output pages 1303 and the number of print pages of reserved print job data 1712 is subtracted from Number of reserved pages 1304.

At step S2009, the reserved print job data management unit 704 stands by for a predetermined time (for example, 10 sec.). After the standby of a predetermined time, the processing returns to step S2001.

As explained above, in the image forming apparatus 111, a reserved print job is performed, that is, the printing processing of reserved print job data is performed. After printing the reserved print job data, the image forming apparatus 111 manages the count relating to the limit of the number of print pages by adding the number of print pages to the number of output pages and subtracting the number of print pages form the number of reserved pages.

(Execution of Normal Print Job)

Upon receipt of a normal print job for which "normal printing" is specified as the output method, the image forming apparatus 111 performs the received normal print job without performing hold processing. Here, processing to print normal print job data without performing hold processing in the case where the image forming apparatus 111 receives a normal print job is explained.

Figure 21:
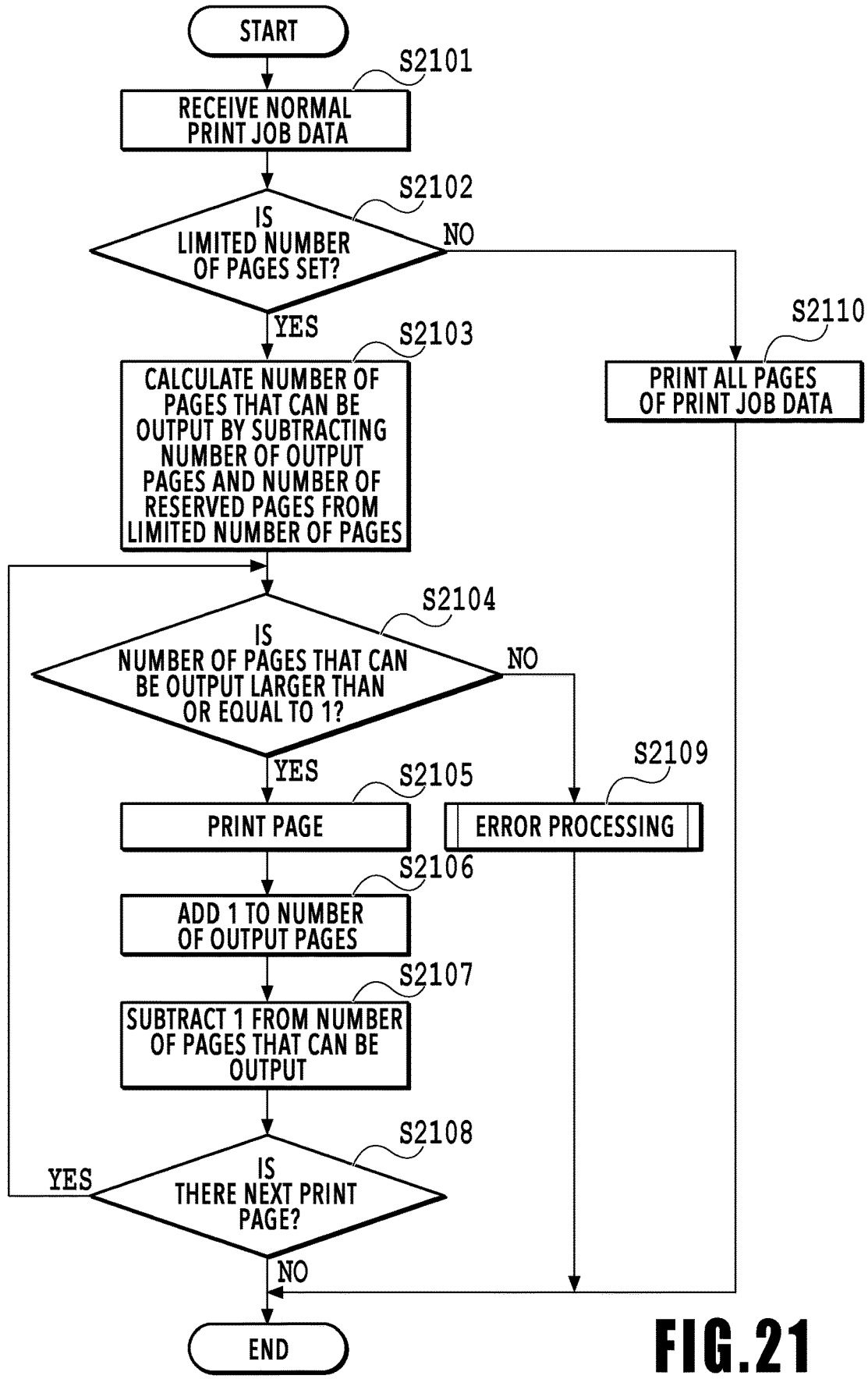
FIG. 21 is a flowchart of printing processing of a normal print job.

FIG. 21 shows a flowchart of execution of a normal print job, that is, printing processing of normal print job data. Each step of the flowchart is performed by a program for performing printing processing being loaded onto the RAM 302 and being executed by the CPU 301. Further, the flowchart in FIG. 21 is started in the state where reserved print job data 1712 shown in the held print job list 1700 in FIG. 17 is held in the image forming apparatus 111. The number of pages management table 1300 is in the state shown in FIG. 13B.

At step S2101, the print job data reception unit 701 receives normal print job data (that is, normal print job) via the network I/F 306. Here, it is assumed that to the received normal print job data, User2 is set as the user ID 602 and as the output method 603, normal printing is set.

At step S2102, the departmental ID management unit 705 refers to the number of pages management table 1300 in FIG. 13B and determines whether or not the limited number of pages is set to the department to which User2 belongs, that is, department 1305. In the case where the limited number of pages is set, the processing advances to step S2103 and in the other cases, the processing advances to step S2110.

At step S2103, the departmental ID management unit 705 subtracts Number of output pages 1303 and Number of reserved pages 1304 from Limited number of pages 1302 of department 1305 and calculates the number of sheets that can be output (that is, number of pages that can be output).

Specifically, the user authentication unit 703 refers to user information 907 of the user information management table 900 and identifies the department to which User2 who is the user of the received normal print job data belongs. Here, it is specified that Department ID 903 is "0000001". Then, the departmental ID management unit 705 refers to department 1305 whose Department ID 1301 of the number of pages management table 1300 is "0000001" and specifies that Limited number of pages 1302 is 2000, Number of output pages 1303 is 1800, and Number of reserved pages 1304 is 180. Consequently, the number of sheets that can be output of department 1305 is 20 (2000−1800−180).

At step S2104, the departmental ID management unit 705 determines whether or not the calculated number of sheets that can be output is larger than or equal to 1. In the case where the calculated number of sheets that can be output is larger than or equal to 1, the processing advances to step S2105 and in the other cases, the processing advances to step S1209.

At step S2105, the print job data management unit 702 transmits one print page of the normal print job data to the printing device 307 via the device I/F 310 and performs printing.

At step S2106, the departmental ID management unit 705 adds 1 to Number of output pages 1303. As a result of addition, Number of output pages 1303 becomes 1801 (1800+1).

At step S2107, the departmental ID management unit 705 subtracts 1 from the calculated number of sheets that can be output. As a result of subtraction, the number of sheets that can be output becomes 19 (20−1).

At step S2108, the print job data management unit 702 determines whether or not there is a next print page in the normal print job data. In the case where there is a next print page, the processing returns to step S1204 and in the other cases, the processing is terminated.

At step S2109, the print job data management unit 702 performs error processing and terminates the processing. It may also be possible for the print job data management unit 702 to, for example, cancel printing of the normal print job data and delete the normal print job data as error processing.

At step S2110, the print job data management unit 702 performs printing by sequentially transmitting all the pages of the normal print job data to the printing device 307 via the device I/F 310 and terminates the processing.

The processing at step S2104 to step S2108 is repeated the number of times corresponding to the number of print pages of the normal print job data. At this time, for example, in the case where the normal print job data is print job data including 21 pages, the normal print job data is printed up to the 20th page and for the 21st page, the results of the determination at step S2104 are NO, and therefore, the processing advances to step S2109. That is, the print job data management unit 702 performs error processing, cancels the printing of the 21st page, and terminates the processing. The number of pages management table 1300 in FIG. 13E shows the state after the normal print job data including 20 pages is printed and 20 is added to Number of output pages 1303. Number of reserved pages 1304 is kept unchanged at 180.

After this, in the case where reserved print job data 1712 is printed, the image forming apparatus 111 performs printing processing of reserved print job data shown in the flowchart in FIG. 20. At this time, the number of output pages of the reserved print job data is 180, and therefore, it is possible for the image forming apparatus 111 to print all the print pages (that is, print pages) within Limited number of pages 1302. The number of pages management table 1300 in FIG. 13F shows the state after printing of reserved print job data 1712 is completed, 180 is further added to Number of output pages 1303, and 180 is subtracted from Number of reserved pages 1304.

As explained above, the image forming apparatus 111 performs printing processing of normal print job data. At the time of performing a normal print job received after a reserved print job, the image forming apparatus 111 calculates the number of sheets that can be output, which takes into consideration the number of print pages (that is, number of reserved pages) of the reserved print job, performs the normal print job within the range, and prints the normal print job data. That is, for a reserved print job, the image forming apparatus 111 performs a count relating to the limit of the number of print pages before performing the reserved print job. Consequently, it is possible for the image forming apparatus 111 to start a held reserved print job at the specified start time after execution of a normal print job and to complete the reserved print job normally.

(Setting of Priority That Guarantees Printing at the Time of Number of Pages Limiting Function Being Effective)

Figure 22:
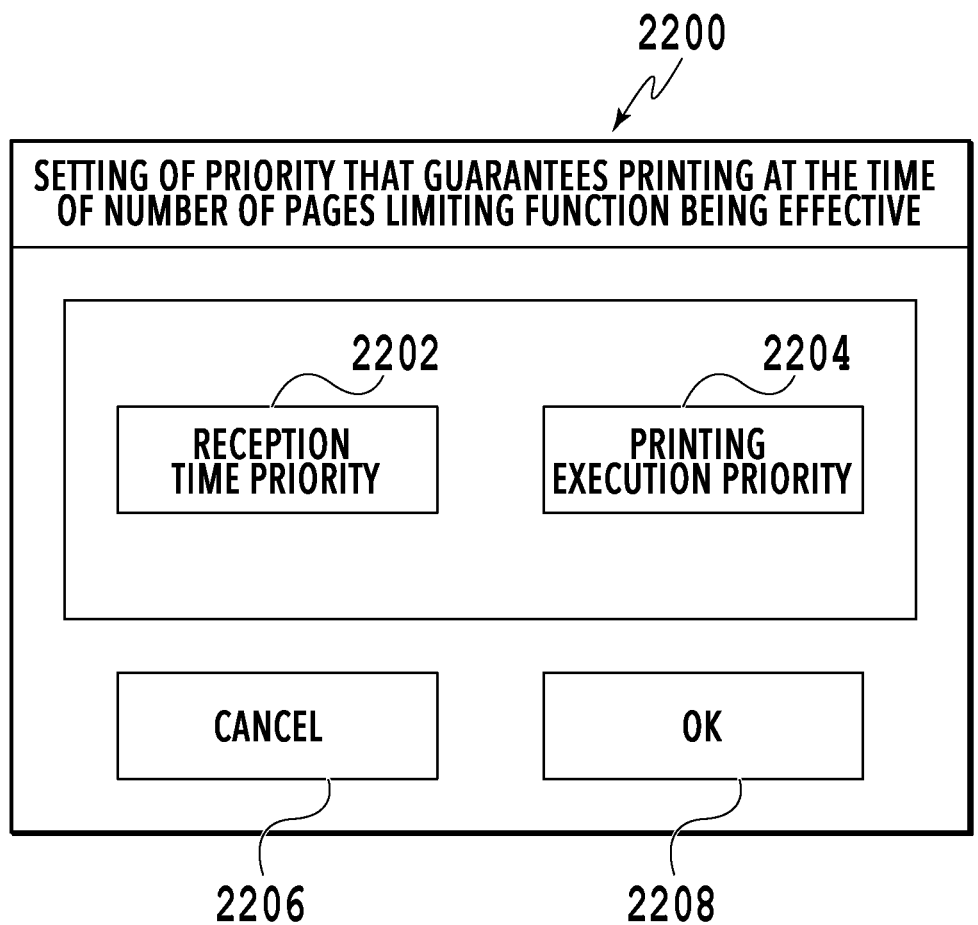
FIG. 22 is a diagram showing an example of a Setting of priority that guarantees printing at the time of number of pages limiting function being effective screen.

In the above-described processing, in the case of receiving reserved print job data (that is, reserved print job), the image forming apparatus 111 adds the number of print sheets of the reserved print job data to Number of reserved pages 1304 of the number of pages management table 1300. Further, in the case of receiving normal print job data, the image forming apparatus 111 refers to the number of pages management table 1300, calculates the number of sheets that can be output by subtracting Number of output pages 1303 and Number of reserved pages 1304 from Limited number of pages 1302, and performs printing so that the number of sheets that can be output is not exceeded. By doing so, the image forming apparatus 111 performs control so as to avoid a case where it is no longer possible to complete printing of reserved print job data normally because the limited number of pages is exceeded at the time of performing printing of the reserved print job data as a result of receiving and printing normal print job data after receiving the reserved print job data. On the other hand, a case is also considered where a user desires to perform printing of normal print job data with priority over reserved print job data that is printed later. Consequently, it may also be possible for the image forming apparatus 111 to enable a user to select whether priority is given to the time of reception (that is, priority is given to the reserved print job data received earlier) or to execution of printing (that is, priority is given to the normal print job data received later). FIG. 22 shows a Setting of priority that guarantees printing at the time of number of pages limiting function being effective screen 2200 (hereinafter, Setting screen 2200). It is possible for a user to select giving priority to the time of reception or giving priority to execution of printing by the CPU 301 of the image forming apparatus 111 displaying the Setting screen 2200 on the operation unit 304 via the operation unit I/F 305. In the case where a user selects a Reception time priority button 2202 and presses down an OK button 2208, the image forming apparatus 111 operates by giving priority to the time of reception. In this case, the image forming apparatus 111 gives priority to printing of the reserved print job data received earlier, and therefore, the image forming apparatus 111 calculates the number of sheets that can be output by taking into consideration the number of reserved pages and then prints the normal print job data received later as described above. On the other hand, in the case where a user selects a Printing execution priority button 2204 and presses down the OK button 2208, the image forming apparatus 111 operates by giving priority to execution of printing. In this case, the image forming apparatus 111 gives priority to printing of the normal print job data received later, and therefore, the image forming apparatus 111 calculates the number of sheets that can be output without taking into consideration the number of reserved pages after receiving the normal print job data received later and performs printing of the normal print job data received later. Further, in the case where a user presses down a Cancel button 2206, it is possible for the image forming apparatus 111 to close the Setting screen 2200 and abort the change setting.

As explained above, it is possible for the image forming apparatus 111 to process print job data by giving priority to the time of reception of print job data or execution of printing in accordance with the setting of priority selected by a user.

(Print Job Management Server)

In the embodiment described above, the count relating to the limit of the number of print pages is managed by the image forming apparatus 111. On the other hand, it may also be possible to manage the count relating to the limit of the number of print pages by a management server, which is a management apparatus of a print job, connected to the image forming apparatus 111 via the network 105.

Figure 23:
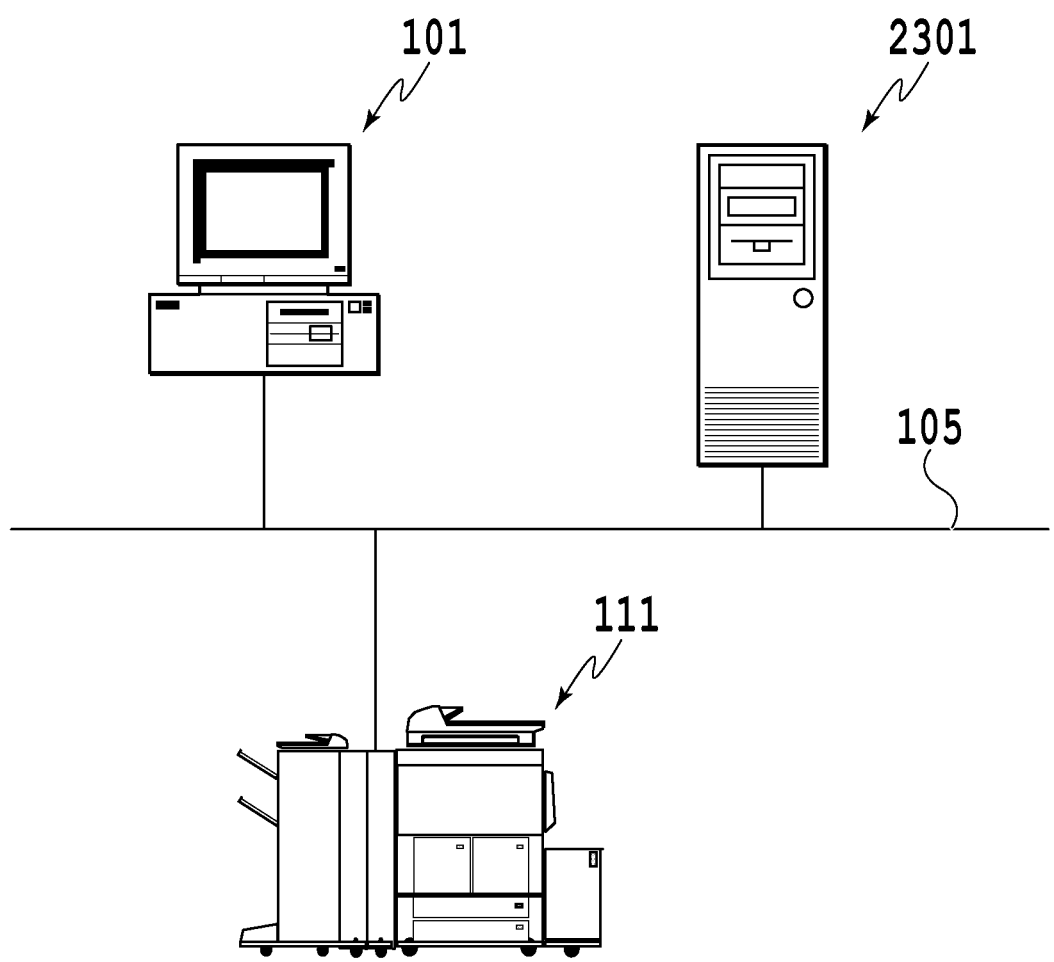
FIG. 23 is a diagram schematically showing a configuration of a network including the image forming apparatus and a print job management server.

FIG. 23 is a diagram schematically showing a configuration of a network including the image forming apparatus 111 and a print job management server 2301 according to one embodiment of the present invention. Compared to the network configuration in FIG. 1, the network configuration shown in FIG. 23 differs in that the print job management server 2301 is connected to the network 105. The print job management server 2301 stores the number of pages management table 1300 shown in FIG. 13A to FIG. 13F in order to manage the count relating to the limit of the number of print sheets in the image forming apparatus 111. It is possible for the image forming apparatus 111 to control the execution of a print job by referring to the number of pages management table 1300 stored in the print job management server 2301 at the time of performing the print job.

As described above, the count relating to the limit of the number of print sheets does not necessarily need to be managed in the image forming apparatus 111 that performs a print job and the count may be managed by a server of a network job.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, by performing a count relating to a limit of the number of print pages, which takes into consideration a reserved print job, it is made possible to complete the reserved print job normally.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-175991 filed Sep. 13, 2017, which is hereby incorporated by reference herein in its entirety.

What is claimed is:

1. An image forming apparatus comprising:
at least one memory that stores instructions, and
at least one processor to execute the instructions to:
set an upper limit of a number of print pages;
receive a print job from an external apparatus;
update, in a case where the received print job is a reserved print job for which a print setting has been made to wait for printing until a print start time specified by a user, a first counter indicating a reserved number of print pages based on the received reserved print job before starting execution of the received reserved print job;
store the received reserved print job in a storage, wherein the storage is configured to be able to store a plurality of print jobs;
update a second counter relating to the upper limit of the number of print pages in accordance with execution of printing based on the received print job;
notify, in accordance with receiving a new print job in a state where a sum of the first counter and the second counter has reached the set upper limit of the number of print pages, a user of a predetermined error; and
start printing the reserved print job determined to reach the print start time in accordance with a determination that the print start time for the reserved print job is reached based on a setting relating to the print start time specified for the reserved print job stored in the storage and information indicating a date and time which the image forming apparatus manages.

2. The image forming apparatus according to claim 1, wherein the instructions are further executed to:
determine whether or not a sum of the first counter, the second counter, and the print pages based on the new received print job reaches the set limit of the number of print pages.

3. The image forming apparatus according to claim 2, wherein
in a case where the reserved print job is received and it is determined that the sum does not reach the set limit of the number of print pages, the reserved print job is stored in the storage and the number of print pages of the reserved print job is added to the first counter.

4. The image forming apparatus according to claim 2, wherein
in a case where a normal print job for which the print start time is not set is received and it is determined that the sum does not reach the set limit of the number of print pages, the normal print job is performed.

5. The image forming apparatus according to claim 2, wherein the instructions are further executed to:
display a screen for managing the print job, wherein
in a case where the reserved print job selected on the screen is deleted, the number of print pages of the reserved print job is subtracted from the first counter.

6. The image forming apparatus according to claim 1, wherein
in a case where the reserved print job is performed, the number of print pages of the reserved print job is added to the second counter and is subtracted from the first counter.

7. The image forming apparatus according to claim 1, wherein
the limit of the number of print pages, the first counter, and the second counter are managed for each group of users.

8. The image forming apparatus according to claim 1, wherein the second counter is reset in a case where a predetermined condition is satisfied.

9. The image forming apparatus according to claim 1, further comprising:
a clock module that manages time information,
wherein the information indicating a date and time which the image forming apparatus manages is acquired from the clock module.

10. The image forming apparatus according to claim 1, wherein the instructions are further executed to:
set a first mode or a second mode as a control mode relating to the received print job,
wherein, in a case where the second mode is set as the control mode relating to the received print job, the first counter indicating a reserved number of print pages is not updated.

11. A control method of an image forming apparatus that performs a count relating to a limit to a number of print pages in accordance with execution of a print job, the method comprising the steps of:
setting an upper limit of the number of print pages;
receiving a print job from an external apparatus;

updating, in a case where the received print job is a reserved print job for which a print setting has been made to wait for printing until a print start time specified by a user, a first counter indicating a reserved number of print pages based on the received reserved print job before starting execution of the received reserved print job;

storing the received reserved print job in a storage, wherein the storage is configured to be able to store a plurality of print jobs;

updating a second counter relating to the upper limit to the number of print pages in accordance with execution of printing based on the received print job;

notifying, in accordance with receiving a new print job in a state where a sum of the first counter and the second counter has reached the set upper limit of the number of print pages, a user of a predetermined error; and starting printing of the reserved print job determined to reach the print start time in accordance with a determination that the print start time for the reserved print job is reached based on a setting relating to the print start time specified for the reserved print job stored in the storage and information indicating a date and time which the image forming apparatus manages.

12. A non-transitory computer readable storage medium storing a program for causing a computer to perform a control method of an image forming apparatus that performs a count relating to a limit to a number of print pages in accordance with execution of a print job, the method comprising the steps of:

setting an upper limit of the number of print pages;

receiving a print job from an external apparatus;

updating, in a case where the received print job is a reserved print job for which a print setting has been made to wait for printing until a print start time specified by a user, a first counter indicating the reserved number of print pages based on the received reserved print job before starting execution of the received reserved print job;

storing the received reserved print job in a storage, wherein the storage is configured to be able to store a plurality of print jobs;

updating a second counter relating to the upper limit to the number of print pages in accordance with execution of printing based on the received print job;

updating, in accordance with receiving a new print job in a state where a sum of the first counter and the second counter has reached the set upper limit of the number of print pages, a user of a predetermined error; and starting printing of the reserved print job determined to reach the print start time in accordance with a determination that the print start time for the reserved print job is reached based on a setting relating to the print start time specified for the reserved print job stored in the storage and information indicating a date and time which the image forming apparatus manages.

* * * * *